Dec. 20, 1966  G. M. G. COTTET  3,293,617
WIRED SYMBOLIC ADDRESSING SYSTEM
Filed July 24, 1963  28 Sheets-Sheet 2

|     | FIG 3a | FIG 3b | FIG 3c | FIG 3d |
| --- | --- | --- | --- | --- |
| FIG 3e | FIG 3f | FIG 3g | FIG 3h | FIG 3i |
| FIG 3j | FIG 3k | FIG 3m | FIG 3n | FIG 3p |
| FIG 3q | FIG 3r | FIG 3s | FIG 3t | FIG 3u |
| FIG 3v | FIG 3w | FIG 3x | FIG 3y | FIG 3z |

FIG. 3

Dec. 20, 1966   G. M. G. COTTET   3,293,617
WIRED SYMBOLIC ADDRESSING SYSTEM
Filed July 24, 1963   28 Sheets-Sheet 14

Dec. 20, 1966  G. M. G. COTTET  3,293,617
WIRED SYMBOLIC ADDRESSING SYSTEM
Filed July 24, 1963  28 Sheets-Sheet 15

Dec. 20, 1966 G. M. G. COTTET 3,293,617
WIRED SYMBOLIC ADDRESSING SYSTEM
Filed July 24, 1963 28 Sheets-Sheet 20

Dec. 20, 1966   G. M. G. COTTET   3,293,617
WIRED SYMBOLIC ADDRESSING SYSTEM
Filed July 24, 1963   28 Sheets-Sheet 23

Dec. 20, 1966   G. M. G. COTTET   3,293,617
WIRED SYMBOLIC ADDRESSING SYSTEM
Filed July 24, 1963   28 Sheets-Sheet 28

United States Patent Office 3,293,617
Patented Dec. 20, 1966

1

3,293,617
WIRED SYMBOLIC ADDRESSING SYSTEM
Gérard Marie Georges Cottet, Paris, France, assignor to Compagnie des Machines Bull (Société Anonyme), Paris, France
Filed July 24, 1963, Ser. No. 297,345
Claims priority, application France, July 24, 1962, 904,871
5 Claims. (Cl. 340—172.5)

The present invention relates to a system by means of which it is possible to extract and select data contained in a store by means of symbolic addresses which are themselves contained in the said store and occupy any positions therein.

Information-processing machines, and more especially electronic computers, comprise many independent functional units, such as card or punched-tape readers, magnetic tapes and magnetic discs, which are not synchronised with one another and which are capable of operating at different speeds. These units, which will hereinafter be called peripheral units, operate in accordance with the directives of a stored programme and must continuously perform with the central system transfers of data, also called information, which represent working instructions, qualitative data or quantities to be processed, depending upon circumstances. In accordance with a known technique, these machines are therefore arranged around a central unit which is responsible for the coordination of the transfers of data and which comprises for this purpose a number of elements of various natures (auxiliary stores, registers, counters, recorders, etc.). A rapid general recorder or "rapid store" operating at high speed attached to the central unit serves as an intermediate storage device for all the data exchanged in the machine. In stored-programme machines, this store also contains the instructions of the programme. Any two peripheral units can exchange data only through the rapid store and it is desirable that the rate of operation of these units should be slowed down as little as possible, if at all, by the recording of the data in a rapid store and their extraction therefrom. It is therefore important, on the one hand, that the rapid store should have available a data capacity sufficient for storing the latter and, on the other hand, that the instructions and the data stored in this store can be extracted in a minimum time. Rapid stores may be, for example, magnetic-core stores in which registering positions serve to store characters in accordance with a preset binary code, so that each character stored in a particular location in the store occupies, for its representation, a predetermined number of binary positions and the characters thus stored are distributed in the store in accordance with a three-dimensional structure defining lines, rows and columns, each line, row or column containing a predetermined number of binary positions. The location of each character in the store is defined by a quantity called an address, each store location being defined by an address peculiar thereto. In a first category of stores, each column contains at most only one character, so that a selection effected as a function of a particular address selects the character situated in the location defined by this address. In a second category of stores, all the store columns contain a like number of locations, each location being capable of containing only one character, and it is sometimes desirable to design a system in which a selection effected as a function of a particular address can select, not only the character situated in a column

2 at the location defined by this address, but also all the characters situated in this column. Consequently, all the characters situated in this column can be simultaneously extracted from the store. If it is desired to select only the character defined by the said address, blocking members are employed which allow the required character to pass and stop all the others. The succession of operations necessary for recording a character in the rapid store or extracting it therefrom, or for simultaneously recording or extracting a number of characters in a common column of the said store constitutes a cycle.

In stored-programme machines, the working instructions are contained in the rapid store. Each instruction of the programme generally consists of a number of characters which include one or generally two characters which define the type of operation which the instruction will initiate (addition, subtraction, transfer, comparison, etc.). The other characters contained in the instruction are generally addresses permitting of selecting and extracting from the store the data on which this operation will be performed. For example, in an instruction relating to an addition, the instruction will comprise, in addition to the characters which will define the adding operation, two addresses relating to the two characters which will be added. The extraction of the said instruction from the store will supply the addresses of the said characters. These two addresses will thereafter make it possible to extract from the store these two characters. The adding operation will then be performed on the characters thus extracted.

A first type of machine in which the instructions are all composed of a well-defined number of characters is known. Such instructions are called "fixed-length" instructions and the successive characters which form each instruction are positioned in one or more reserved columns of the store in successive location. In such machines, it is generally arranged that, in the columns containing the instructions, each column is entirely filled and contains only characters pertaining to the same instruction. In this way, each of the instructions is always entirely contained in the same number N of columns. The advantage of this procedure is that the instructions can be extracted very rapidly from the store, since it is sufficient, as has just been seen, to effect the selection by supplying the address of a character situated in a column in order to be able to extract simultaneously from the store in one cycle all the characters of the instruction situated in this column. It will be seen that when stores capable of containing a number of characters per column are employed, a fixed-length instruction contained in N columns can thus be extracted from the store in the course of a substantially reduced number N of cycles or, what amounts to the same thing, in a much shorter time than in the case of a character-by-character extraction. One disadvantage of this method is that the use of fixed-length instructions necessitates for the recording of such instructions in the store, a larger space in the store than when so-called variable-length instructions are used, to which exactly the required variable number of characters are devoted in order that each of them may retain its significance. This then results in an appreciable waste of space in the store, which would advantageously be used to store other characters.

A second type of machine is known, in which this disadvantage is obviated because the instructions used are of variable length. The instructions are introduced one after the other into the store and a common store column may thus contain characters belonging to two neighbouring, differing instructions. Consequently, the recording capacity of the store is utilised to the full and the waste of space is avoided. However, the extraction of an instruction from the store then takes place character-by-character and requires as many cycles as the instruction comprises characters. Comparatively, the extraction of an instruction in this type of machine is less rapid than in machines belonging to the first type.

One of the objects of the present invention is to provide an addressing system by means of which it is possible to select instructions or data contained in columns forming part of a store, each of the columns being capable of storing a number of characters, which system may be employed either in a first type of machine in which the instructions are of fixed length, or in a second type of machine in which the instructions are of variable length, while obviating the disadvantage of these two types.

In accordance with the present invention, there is provided an addressing system for selecting quantities to be processed which are contained in a direct-access store by means of addresses forming part of instructions recorded in this store, wherein the store is designed to contain three different categories of data, the data of the first category consisting of instructions, the data of the second category consisting of developed addresses and the data of the third category consisting of the quantities to be processed, the addresses which form part of the instructions being symbolic addresses, hereinafter called indexes, occupying in the aforesaid store a reduced number of locations, the said system comprising first selecting means co-operating with the store to select instructions and extract them from said store, an intermediate register designed as a store output to receive at least one part of an instruction extracted from the said store, second selecting means for selecting an index and extracts them from the aforesaid part of an instruction contained in the intermediate register, an index register connected to receive the said selected index, means for transmitting the said index contained in the index register to the aforesaid first selecting means in order to choose a developed address and extract it from the store, whereby the said developed address makes it possible, after extraction from the store, to select and extract from the said store a quantity to be processed.

The advantage of this system is apparent above all when one address occurs a number of times in the instructions of the programme, because in the system hitherto employed each store location has been designated by an address of $n$ characters, and in order to indicate a given location it has therefore been necessary for each address, forming part of a stored instruction, to comprise $n$ characters. In the course of the programme, this same address could occur in another stored instruction and again comprise $n$ characters. One and the same address used $k$ times in the course of one and the same programme to extract one and the same quantity from the store therefore occupies the place of $kn$ characters in all in the store. With the system employed in accordance with the invention, each index consists of, for example, two characters, which necessitates a place for only two characters in the store, to which there must be added, however, the $n$ characters of the developed address, or quantity address, which can be selected by means of this index. This developed address in turn makes it possible to extract a quantity from the store. The total space necessary is therefore of $n+2$ characters. If, in the course of the programme, it is again necessary to extract this quantity from the store, it is sufficient to select again the column containing these $n$ developed address characters by means of the same index as before, which in turn necessitates only two characters, and then to use this address for extracting from the store the quantity to be processed. Two constituent characters of an index are thus sufficient for extracting the required developed address from the store, so that if this address is used $k$ times in the course of one programme it will be necessary to extract it from the store each time by means of one and the same index, which will necessitate in all $k$ identical indexes. The total space necessary for the storage in the store will then be of $n$ characters for the developed address and of $2k$ characters for all of these indexes, i.e. $n+2k$ characters in all.

The saving of characters obtained in the present invention will become apparent when one and the same address is used in the course of one programme a number of times such as $$kn \geq n + 2k, \text{ i.e., } k \geq \frac{n}{n-2}$$

Thus, when developed addresses consisting of $n=3$ characters are used, the saving which can be effected by means of the invention is apparent when one and the same address is used $$k = \frac{3}{3-2} = 3$$

times in the course of the programme. By using developed addresses consisting of $n=4$ characters, the saving is obtained for $$k = \frac{4}{4-2} = 2$$

times, and it becomes even greater if addresses having a large number $n$ of characters are employed. The advantage of the present invention is thus clearly apparent, because on average each developed address written in one and the same programme is used more than two or three times. Consequently, the addressing system according to the invention is particularly advantageous when it is applied to stores having a high character capacity and utilising, for example, addresses consisting of 4, 5 characters or more.

Another advantage of the present invention consists in a simplification in the programming of the machine, because, since the developed addresses of the quantities to be processed are separately stored once and for all for a particular programme, the instructions can then comprise, in their constitution, indexes instead of quantity developed addresses, and the programmer who stores the programme no longer has to be concerned with the location occupied in the store by the addresses of the quantities. On the other hand, the repertory of characters employed for these indexes comprises not only the digits, but also the usual characters of the alphabet, so that it is possible to give these indexes a more memotechnical value. The instructions may then be stored one after the other, they may be of variable length, although this characteristic is not absolutely essential, and they may comprise in their structure a variable number of indexes, in accordance with the work to be performed. Thus, the system according to the invention makes it possible to give the machine maximum flexibility of use.

It is no longer possible to give one and the same stored item of information two different addresses of conventional type, because the developed address is related by construction to only one location in the store, and vice versa. Conversely, in the proposed system, it is possible to use more different indexes for selecting one and the same stored datum, which is highly desirable to programmers.

The invention will be more readily understood with reference to an example of application given by way of non-limiting indication, from which further advantages and features of the invention will become apparent. The said example refers to the accompanying drawings, in which:

FIGURE 1 diagrammatically illustrates a machine utilising a storage addressing system according to the invention.

FIGURE 2 diagrammatically illustrates the main parts of a store of the said machine, which will enable the operation and the advantages of the connections of this store to the remainder of the machine to be more readily understood.

FIGURE 2a illustrates an idealised hysteresis loop of the magnetic material of which the magnetic cores of the said store are formed.

FIGURES 3a to 3k, 3m, 3n and 3p to 3z form, when assembled, a more detailed diagrammatic view of the machine illustrated in FIGURE 1.

FIGURE 3 indicates the manner in which FIGURES 3a to 3k, 3m, 3n and 3p to 3z are assembled.

FIGURES 4a to 10a are diagrams symbolically representing the elemental circuits of FIGURES 4 to 10, these symbolic diagrams being those which appear in FIGURES 3a to 3k, 3m, 3n and 3p to 3z.

GENERAL ARRANGEMENT

Figure 1:
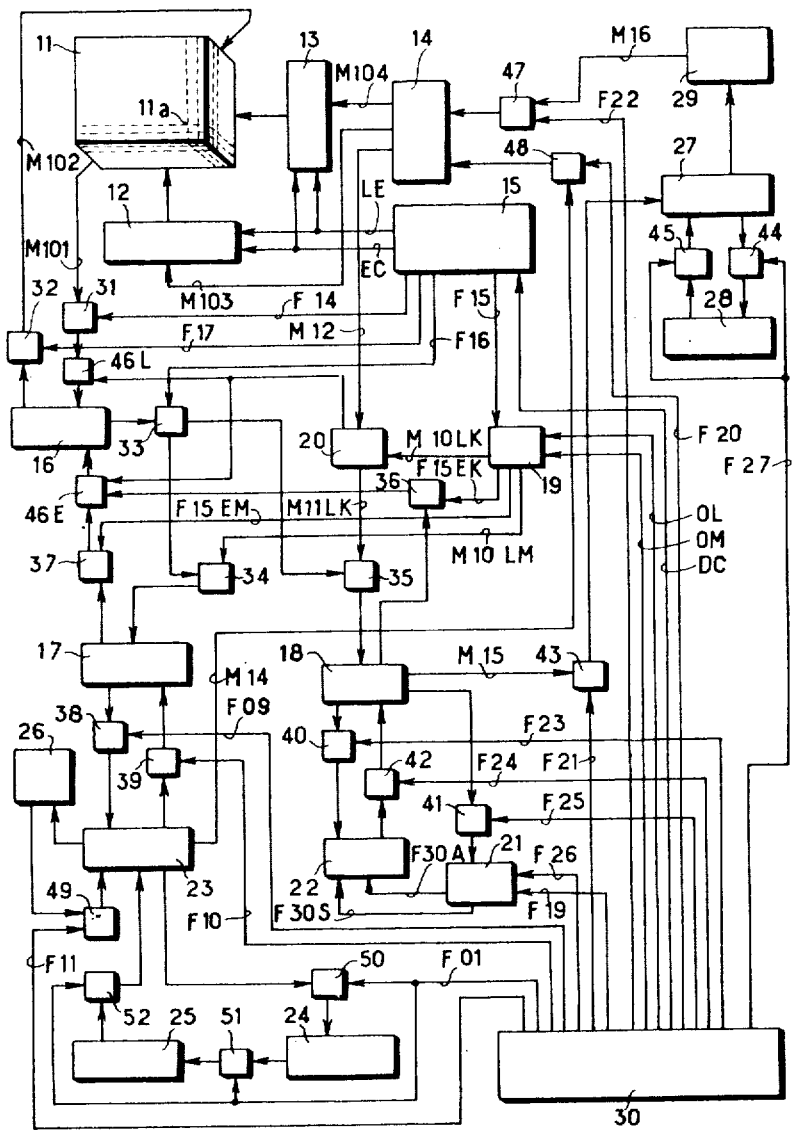

A machine utilising the wired symbolic addressing system according to the invention is diagrammatically illustrated by way of example in FIGURE 1. In order that the construction and operation of the said machine may be more readily understood, the various constituent parts have been shown in the form of blocks or rectangles. Among the parts comprised in the machine illustrated in FIGURE 1, there will be seen a rapid matrix store 11, which will be assumed to consist, for example, of magnetic cores, but which may equally well be any other form of rapid store of the type called a "random-access store," or, what amounts to the same thing, in which access may be had at any instant to any character contained in the store, regardless of the contents. The said store contains all the characters (letters, digits and various signs) which have to be used in the course of the operations performed within the machine. Each character is formed of a combination of six binary digits (1 or 0) to indicate the particular significance of the character. It is convenient to regard the set of cores of the store as being distributed to form a structure composed of lines, rows and columns. In accordance with the particular representation used in FIGURE 1, there would be a predetermined maximum number of characters in each column 11a. For example, in the machine illustrated in FIGURE 1, the store may contain five characters per column, the characters thus contained in the same column forming a "group" of characters. When each column of the store is energised so as to indicate a group of characters, the said group may be extracted from the store by means of a set of conductors M101, or introduced into the store by means of a set of conductors M102, choosing a coordinate X and a coordinate Y extending through the desired column. The coordinate X is determined with the aid of a selector X denoted by the number 12, and the coordinate Y is determined by means of a selector Y denoted by the number 13. A decoding member 14 contains a datum called an address, which defines the location of a character or of a group of characters in the store. In the case of the machine illustrated in FIGURE 1, there has been chosen a store capable of holding up to 40,000 characters, which characters may be contained in 8,000 columns of 5 characters each. In order that each store location may be defined, it will be desirable to have available 40,000 different addresses. The location of the character situated in the upper left-hand corner of the store illustrated in FIGURE 1 is defined by the address 00000. The location of the character situated in the lower right-hand corner of this store is defined by the address 39,999. In order to designate the location of a character within the store, it will therefore be necessary to use an address composed of five characters. For example, an address will be written 00016 and not simply 16. A part of the address contained in the decoder 14 is decoded by the latter and sent to the selector 12 by means of a set of conductors M103. The other part is decoded by the decoder 14 and sent to the selector 13 through a set of conductors M104. The selectors 12 and 13, however, can become operative only under the effect of a reading order LE coming from an auxiliary order generator 15 or of a writing order EC coming from the said generator. The reading order is sent in the form of a positive voltage of very short duration, or pulse, by the generator 15 to the selectors 12 and 13 if it is desired to extract a group of characters from the store. The writing order is sent in the form of a pulse by means of the generator 15 to the selectors 12 and 13 if it is desired to introduce a group of characters into the store. An intermediate register 16, which is adapted to contain a group of five characters, serves temporarily to retain a group of characters which has just been extracted from the store or is to be introduced into it. More particularly, this register permits the restorage in the store of a group of characters which has just been extracted from it. The transfers of groups of characters between the register 16 and the store are determined by transmitting members 31 and 32 disposed in the path of the sets of conductors M101 and M102, respectively, which transmitting members permit the said transfers when they are subjected to the action of orders coming from the generator 15, the member 31 receiving from the said generator, in the form of a pulse, an order F14 when a transfer is to be effected from the store to the register 16, and the member 32 receiving from the generator 15 an order F17 when a transfer is to be performed from the register 16 to the store. In FIGURE 1, there will be seen transmitting members 33 to 52, identical to the members 31 and 32 and having for their function precisely either to permit or to prevent, i.e., to control the transfers of characters or groups of characters between the other parts of the machine. Thus, the member 31, which receives an order F14 from the auxiliary order generator 15, controls the transfer, in the form of pulses or positive voltages of very short duration, of the five characters extracted from the store, to a transmitting member 46L. The function of the member 46L is to prevent or to permit the transfer of all or part of the group of five characters coming from the member 31 and having to be introduced into the register 16. Acting under the effect of a selection indicator 20, the member 46L can either permit the transfer of the five characters from the member 31 to the register 16 or prevent this transfer, or it can permit the transfer of only four of the five characters. The register 16 can transfer its contents, by means of two members 33 and 34, into a "five-character" buffer register 17 which can contain five characters. This transfer is permitted owing to an order F16 coming from the generator 15 and acting on the member 33, and owing to an authorising voltage supplied by an order register 19 and reaching the member 34 by way of a conductor M10LM. The order register 19 has the object of registering two orders, one being an order called the "reading" order and coming from a general order generator 30 by way of a conductor OL, and the other being an order called a "word" order coming from the said generator 30 by way of a conductor OM. These two orders arrive in the form of pulses and are registered in the register 19. The register 16 can transfer one of the characters which it contains to a "one-character" connecting register 18 which can contain only one character. This transfer is permitted owing to an order F16 which, coming from the generator 15, acts on the member 33. In this case, an authorising voltage supplied by the register 19 arrives, by way of a conductor M10LK, at the selection indicator 20, which in turn supplies an authorising voltage which arrives at a member 35 by way of a conductor M11LK. Since the capacity of the register 18 is of one character, while that of the register 16 is of five characters, it is necessary to select that one of the five characters which is to be transferred from the register 16 to the register 18. This selection is effected by means of the selection indicator 20, which acts on the member 35 as a function of a part of the address contained in the decoder 14, the said part entering the indicator 20 by way of a set of conductors M12.

The transfer of the five characters from the register 17 to the register 16 is permitted owing to an order F15 coming from the generator 15 and, after passing through the order register, being transmitted in the form of an order marked F15EM, which acts on a member 37. The member 37 then sends, in the form of pulses, the five characters from the register 17 to a member 46E. The member 46E, which acts under the effect of an authorising voltage supplied by the selection indicator 20, then authorises the transfer of the five characters into the register 16.

A member 36 is provided for transferring a character from the register 18 to the register 16. This member is set in operation by means of an order F15 coming from the generator 15 and, after passing through the order register, being transmitted in the form of an order marked F15EK, which acts on the member 36. The member 36 then sends the character in the form of pulses from the register 18 to the member 46E. In order that the said character may be transferred to the exact place which it is to occupy in the register 16 among the five possible places, the indicator 20 acts on the member 46E by subjecting it to appropriate voltages. A member 38 rendered operative by an order F09 coming from the order generator 30 permits the transfer of the characters from the register 17 into an address register 23 which is capable of containing five characters. A member 39 rendered operative by an order F10 coming from the order generator 30 permits the transfer of the characters from the address register 23 into the register 17. The register 23 is intended to retain the address of a character of the store. It is connected to an address-modifying member 26 which has the object of modifying the address contained in the register 23 by increasing or decreasing it by a given quantity. For the sake of explanation, this quantity is here given as being, for example, equal to +1. To any number contained in the register 23, the member 26 causes this same number increased by 1 to correspond and it is thus possible to modify successively the address contained in the register 23, that is to say, to advance it. However, this advance can be effected only by means of a member 49 set in operation by an order F11 coming from the generator 30. Two registers 24 and 25 serve in principle each to contain the five-character address of a character to be processed. Thus, if it is desired to perform an operation such as an addition, subtraction or comparison, for example, on two operands A and B each consisting of one character, the register 24 will contain the address of the operand A and the register 25 will contain the address of the operand B. If the operands comprise a number of characters, it is desirable to cause the addresses of the registers 24 and 25 to advance in order that an operation may be successively performed on all the characters of these operands. This address advance will be effected by performing simultaneously permutations of the contents of the three registers 23, 24, 25, the register 23 transferring its contents into the register 24, which then transfers its contents into the register 25, which in turn transfers its contents into the register 23. When the address which it is desired to advance is situated in the register 23 in the course of these permutations, an order F11 acts on the member 49, thus modifying the address of the said register. The permutations of the contents of the registers 23, 24 and 25 are effected by means of members 50, 51 and 52 simultaneously operated by an order F01 coming from the order generator 30. The address contained in the register 23 may be sent to the decoder 14 through a set of conductors M14, by means of a member 48 set in operation by an order F20 coming from the generator 30. Each character contained in the register 18 may be either a character of a quantity to be processed or a character forming part of an instruction. In the latter case, it may be either a particular character called the character T.O. and indicating the nature of the operation to be performed (addition, subtraction, comparison, transfer . . .), or a character forming part of an index. According to the invention, an index will consist, for example, of two characters and may be contained in a register 27 called an index register 27. Since the register 18 can contain only one character, each constituent character of a particular index will be successively extracted from the store, temporarily stored in the register 18 and then transferred into the register 27. This transfer will be effected by means of a member 43 connected to the register 18 by means of a set of conductors M15 and set in operation by an order F21 coming from the generator 30. Two transfers will thus be effected in order that the register 27 may be occupied by the two constituent characters of an index. An encoder 29 connected to the register 27 makes it possible to convert an index contained in the register 27 into an address comprised between 0000 and 7995, this address consisting of four characters and being terminated either by a digit 0 or by a digit 5. The address thus obtained can be sent to the decoder 14 through a set of conductors M16, by means of a member 47 set in operation by an order F22 coming from the generator 30. The index contained in the register 27 may be transferred into an index register 28 so that a second index may, if necessary, be stored in the register 27. As has been briefly explained in the preamble, each index consists of two characters and serves to extract from the store a developed address of five characters contained in a column of the said store. This developed address thereafter serves to extract from the said store a character which will be processed in accordance with the indication of the character T.O. of the instruction.

In order to avoid any confusion in the following text, the particular address resulting from the transformation of an index by means of the encoder 29 will be called the reduced address. Likewise, the address which is extracted from the store when a selection is effected from a reduced address will be called the developed address. It remains understood that the address which can be received by the decoder 14 is either a reduced address, where this address is transmitted by the member 47, or a developed address, where this address is transmitted by the member 48.

The character T.O. may be, for example, either the sign + or the sign − in the case of an instruction intended to initiate an adding or subtracting operation. The character to be processed, which is extracted from the store and then introduced into the register 18, is thereafter transferred into a processing member 22 by means of a member 40 set in operation by an order F23 emanating from the generator 30. The processing member 22 may be an operator such as an adder, a comparator, or any other processing member of a peripheral unit. In order to facilitate the understanding of the description, it will be assumed that this processing member is an adder-subtractor. The characters to be processed (to be added or subtracted) will be successively transferred into the adder-subtractor 22. Once the operation has been performed, the result will be transferred into the register 18 by means of a member 42 set in operation by an order F24 coming from the generator 30. The character T.O. which defines the type of operation to be performed (addition or subtraction) is, before any operation is initiated, extracted from the store, then introduced into the register 18 and thereafter finally transferred into an instruction decoder 21 by means of a member 41 set in operation by an order F25 coming from the generator 30. The initiation of the operation performed by the adder-subtractor 22 is effected by an order F19 coming from the generator 30 and arriving at the instruction decoder 21, which in turn sends to the adder-subtractor 22, depending upon the operation to be performed, either an addition order F30A or a subtraction order F30S, in accordance with the indication supplied by the decoding of the character T.O.

When two indexes are used in the course of the same instruction, these indexes are contained in the registers 27 and 28. The registers 27 and 28 can permutate their contents by means of two members 44 and 45 simultaneously set in operation by an order F27 coming from the generator 30.

The auxiliary order generator 15 may be set in operation by means of a starting order DC coming from the generator 30. As a result of the despatch of a single order DC, the generator 30 thus triggers, by means of the generator 15, the despatch of a series of order pulses which permit any introduction or any extraction of a character or group of characters into or from the store. Although the use of an auxiliary generator such as the generator 15 makes it possible to simplify the number of circuits of the general generator, a different type of arrangement is conceivable which utilises only one generator, all the order pulses then emanating from this generator, or on the other hand any type of arrangement utilising a general generator and as many auxiliary generators as are required by virtue of the complexity of the machine.

The "one-character" connecting register 18 may in principle be connected to various peripheral units (card scanners, perforators, printers, encoders, monitoring devices . . .) by connections which have been omitted from FIGURE 1 in order not to overload it. These connections do not form part of the invention. Likewise, depending upon the requirements of the processing of the data, the register 17 may be connected to various peripheral units or to various members such as visualising or monitoring members, by connections omitted from the figures for the sake of simplicity.

BASIC CIRUCITS

There will now be described the elemental circuits employed in the design of the machine. It is to be understood that the circuits about to be described may be replaced by other circuits having similar functions, such as elemental circuits comprising valves, transistors, cryotrons or the like, without departing from the invention.

Figure 4:
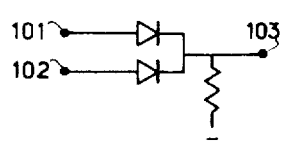
FIGURES 4 to 10 are diagrams of elemental circuits employed in the design of the machine.
Figure 4A:
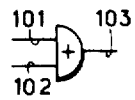

The circuit illustrated in FIGURE 4 is a typical mixer circuit also known as an OR circuit. In the circuit of FIGURE 4, which is constructed with two diodes connected to a common output 103, which is in turn connected through an appropriate resistor to a negative-voltage source (not shown), it is known that when one of the two inputs 101 and 102, or both, is/are brought to an appropriate positive potential, a positive voltage is set up at the output 103. The symbolic form in which this OR circuit is adopted is illustrated in FIGURE 4a. Although the said circuit has been illustrated only with two inputs in FIGURES 4 and 4a, it is to be understood that such a circuit may comprise, in accordance with requirements, more than two diodes and consequently more than two inputs.

Figure 5:
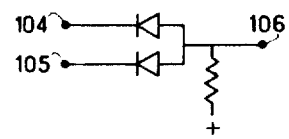
Figure 5A:
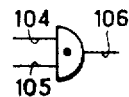

The circuit illustrated in FIGURE 5 in a coincidence circuit known as an AND circuit. In the circuit of FIGURE 5, which is constructed with two diodes connected to a common output 106 which is in turn connected through an appropriate resistor to a positive-voltage source (not shown), it is known that if positive voltages are applied to the two inputs 104 and 105, the potential of the output 106 increases and is established at a positive value, while if only one of the inputs is not brought to a positive voltage, the potential of the output 106 does not rise appreciably. The symbolic form in which this AND circuit is adopted is illustrated in FIGURE 5a. It is to be understood that such a circuit may comprise more than two inputs.

Figure 6:
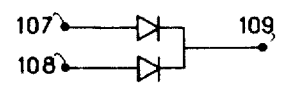
Figure 6A:
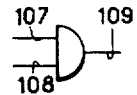

The circuit illustrated in FIGURE 6 is a mixer circuit which does not perform any particular logical function, but which enables positive voltages of very short duration, or positive pulses, arriving through different inputs 107–108 to be transmitted to a common output 109, so that no positive pulse arriving through one of the inputs can in return react on the other inputs. The symbolic form in which this circuit is adopted is illustrated in FIGURE 6a. Save exceptions, this circuit will generally not be referenced in FIGURES 3a to 3k, 3m, 3n and 3p to 3z. Otherwise, it may comprise a number of inputs.

Figure 7:
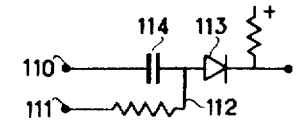
Figure 7A:
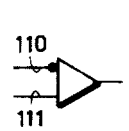
Figure 9:
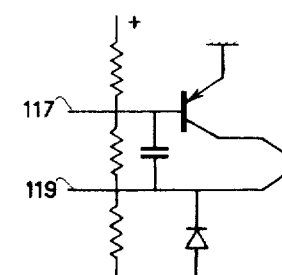

The circuit illustrated in FIGURE 7 is a special coincidence circuit intended to transmit the positive pulses necessary more especially for controlling trigger circuits such as that illustrated in FIGURE 9. One of the two inputs 110, marked by a dot in FIGURE 7a, is intended to receive a positive pulse to be transmitted. There is applied to the other input 111 a voltage which is either positive or negative. As long as the input 111 is negative, the pulses arriving through the input 110 remain ineffective, owing to the fact that the wire 112 is then at a negative potential and the diode 113 blocks the transmission of the pulses. However, when the input 111 is brought to a positive voltage, the wire 112 is also brought to a positive potential, which permits transmisison of the pulses coming from the input 110. In fact, the condenser 114 then transmits a positive pulse which momentarily raises the potential of the wire 112. The circuits are so arranged that the diode 113 then permits the passage of the current. The circuit of FIGURE 7 is symbolically represented in FIGURES 3a to 3k, 3m, 3n and 3p to 3z as indicated in FIGURE 7a. The first two reference digits of a coincidence circuit will generally be those of the reference of the transmitting member of which it forms part, since the transmitting members consist of coincidence circuits. A coincidence circuit may be used to permit or prevent the passage of a pulse, depending upon whether the input 111 is brought to a positive potential or to a negative potential. If the latter potential represents the binary digit 0, it will be possible by sending a pulse through the input 110 to obtain or not to obtain a pulse at the output, depending upon the state of the conductor connected to the input 111, the propagation of a transmitted pulse then corresponding to the transfer of a binary digit 1, while the absence of a pulse (blocked pulse) corresponds to the binary digit 0. In the following text, when the term "input" is used without any particular indication, this term will always denote the input to which the voltage is applied, i.e., the input 111.

Figure 8:
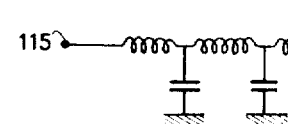
Figure 8A:
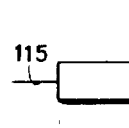

The circuit illustrated in FIGURE 8 is a delay line consisting of a set of self-inductances in series and capacitances in parallel, and the object of which is to delay the positive pulses arriving at the input 115. Any pulse arriving through the input 115 is delayed in the course of its travel through the line and then arrives at the output 116 at the end of a predetermined time, this delay being a function of the number of elements constituting the line. The operation of such a delay line is so well known that it is unnecessary to give further details thereof. Symbolically, such a line will be represented as indicated in FIGURE 8a.

Figure 9A:
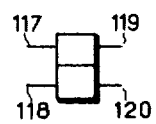

The circuit illustrated in FIGURE 9 is that of a conventional transistor flip-flop comprising two inputs 117 and 118 and two outputs 119 and 120. When the voltage at the output 120 is more positive than that at the output 119, the flip-flop is said to be in the state 0. In the contrary case, it is said to be in the state 1. A positive pulse applied to the input 117 changes over the flip-flop to the state 1, or, if it is already in this state, keeps it so. A positive pulse applied to the input 118 causes the flip-flop to change to the state 0, or if it is already in this state, keeps it so. The circuit of a flip-flop will be represented as indicated in FIGURE 9a. In the description, the inputs 117, 118 and the outputs 119, 120 will from time to time be called "normal input," "complementary input," "normal output" and "complementary output" respectively. When the flip-flop is in the state 1, that one of the two outputs which is at the more positive voltage is the "normal" output. In the contrary case, it is the "complementary" output.

Figure 10:
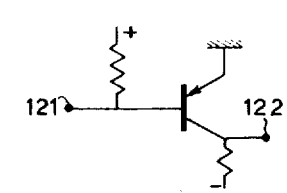
Figure 10A:
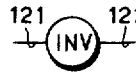

The circuit illustrated in FIGURE 10 is an inverter. The output 122 is positive each time the input 121 is negative and vice versa. The circuit of an inverter will be represented in FIGURES 3a to 3k, 3m, 3n and 3p to 3z as indicated in FIGURE 10a, i.e., by a circle containing the letters INV.

In the design of the machine, amplifying circuits and regenerators are used to adjust the voltages and the pulses to an appropriate value necessary for the proper operation of the machine. For the purpose of simplification, these circuits have been omitted from the figures.

DESCRIPTION AND OPERATION OF STORE ELEMENTS

There will now be described the structure and the operation of the rapid store 11 diagrammatically indicated in FIGURE 1, the said store only being an example intended to illustrate the description.

Figure 2:
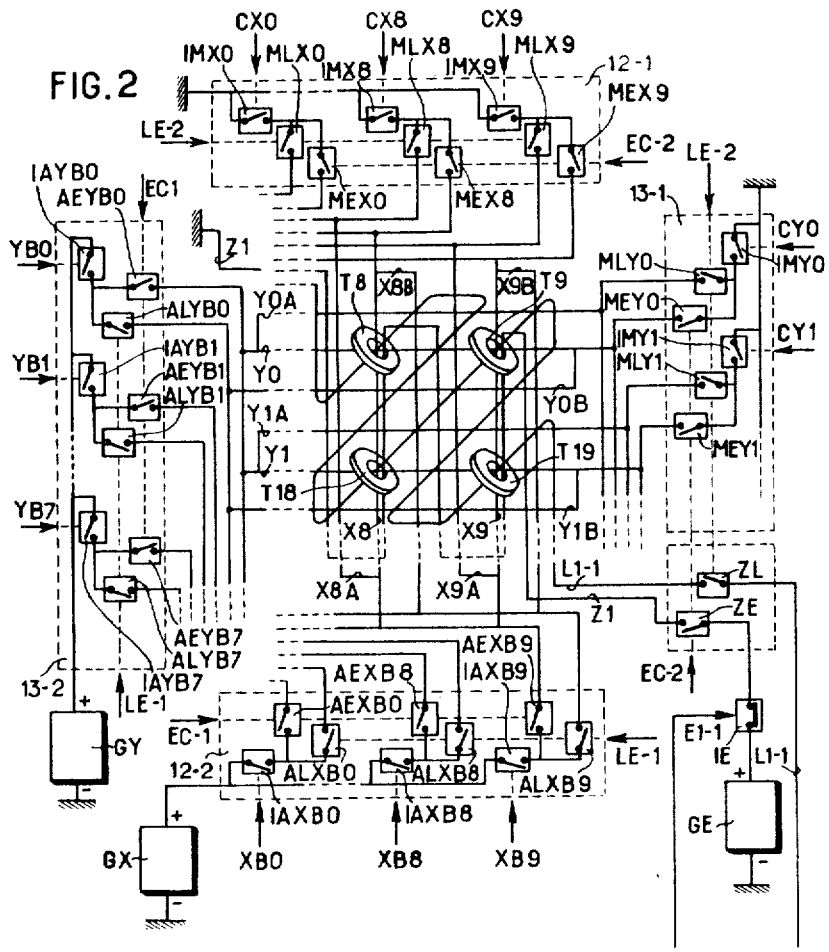
Figure 2A:
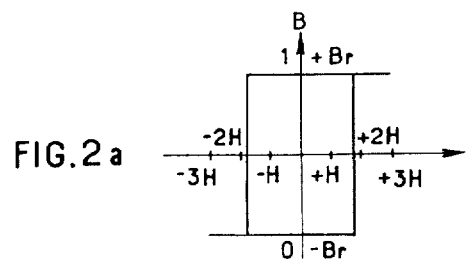

FIGURE 2 illustrates a detail of this store, showing a set of four cores T8, T9, T18, T19, although this store actually comprises 240,000 cores in order to be able to store 40,000 characters. Each core, which consists of magnetic material having a substantially rectangular hysteresis loop, can assume two stable magnetic states characterised by a positive residual induction +Br or by a negative residual induction −Br, thus permitting of registering in each of them or extracting therefrom a binary datum. The value 0, which is arbitrarily chosen, corresponds for example to the stage −Br, while the elemental value 1 then corresponds to the state +Br. As is shown by the hysteresis loop illustrated in FIGURE 2a, the application of a magnetic field +2H to a core causes this core to change from the state 0 to the state 1 in order to register an item of information therein, the application of a magnetic field −2H returns it to the state 0 by generating an output pulse, while a field +H or −H does not modify the state of the core.

Referring again to FIGURE 2, it will be seen that each of the four cores T8, T9, T18 and T19 is traversed by four conductors, two of which serve to select a core, while the third L1–1 serves to extract a binary digit from the store, and the fourth Z1 is an inhibiting conductor. A horizontal conductor Y0 extends through the cores T8 and T9, a horizontal conductor Y1 extends through the cores T18 and T19, a vertical conductor X8 extends through the cores T8 and T18, a vertical conductor X9 extends through the cores T9 and T19, and the conductors Z1 and L1–1 extend through the four cores in series. In order to permit the passage of the current through the conductor Y0 in one direction, one end of the latter may be connected by means of two "feed" switches AEYB0 and IAYB0 to the positive terminal of a current generator GY, while the other end of this conductor may be earthed by means of two "earth" switches MEY0 and IMY0. Likewise, the passage of the current through the conductor Y1 in one direction is permitted by two "feed" switches AEYB0 and IAYB0 connecting one end of the said conductor to the positive terminal of the generator GY, and by means of two "earth" switches MEY1 and IMY1 connecting the other end to earth. The negative terminal of the generator GY is in turn earthed. A set of two conductors Y0A and Y0B connected to two switches MLY0 and ALYB0 respectively, which are disposed as indicated in FIGURE 2, permit of reversing the direction of the current through the conductor Y0. Likewise, the reversal of the current through the conductor Y1 is permitted by two conductors Y1A and Y1B connected to two switches MLY1 and ALYB0 respectively, as shown in FIGURE 2. In a similar manner, a set of conductors X8A, X8B and switches MLX8, IMX8, MEX8, IAXB9, AEXB9 and ALXB9 permit the passage of the current through the conductor X8 in one direction or the other, the feed switches IAXB9, AEXB9 and ALXB9 being connected to the positive terminal of a current generator GX, the earth switches IMX8, MLX8 and MEX8 being connected to earth, and the negative terminal of the generator GX being in turn connected to earth, all these elements being disposed as indicated in FIGURE 2. Likewise, a set of conductors X9A, X9B and switches MLX9, IMX9, MEX9, IAXB9, AEXB9 and ALXB9 permit the passage of the current through the conductor X9 in either direction, the feed switches IAXB9, AEXB9 and ALXB9 being connected to the positive terminal of the generator GX, the earth switches IMX9, MEX9 and MLX9 being connected to earth, while all these elements are arranged as shown in FIGURE 2. One of the ends of the conductor Z1 is earthed, while the other is connected to a switch ZE. A "recording" current generator GE, of which the negative terminal is earthed, has its positive terminal connected to the switch ZE through a recording switch IE. A switch ZL, arranged as shown in FIGURE 2, is disposed on the conductor L1–1.

All these switches have been illustrated as electric switches, but it is obvious that they may consist of any other device such as a coincidence circuit, an electronic switch, a relay or the like.

The switches AEXB9 and AEYB0 are simultaneously set in operation by a writing order EC–1, symbolically represented by an arrow, which comes from the order generator 15 of FIGURE 1. The switches MEX 8 and MEX9, on the one hand, and MEY0, MEY1 and ZE on the other hand are simultaneously set in operation by a writing order EC–2 coming from the generator 15. The switches ALXB9 and ALYB0 are simultaneously set in operation by a reading order LE–1 coming from the generator 15. The switches MLX8 and MLX9, on the one hand, and MEY0, MEY1 and ZL on the other hand are simultaneously set in operation by a writing order EC–2 coming from the generator 15. The switches ALXB9 and ALYB0 are simultaneously set in operation by a reading order LE–1 coming from the generator 15. The switches MLX8 and MLX9, on the one hand, and MLY0, MLY1 and ZL on the other hand are simultaneously set in operation by a reading order LE–2 coming from the generator 15. The feed switch IAYB0 may be set in operation by the application of a current symbolically represented by an arrow YB0 and coming from the decoding member 14 illustrated in FIGURE 1. Likewise, the feed switch IAXB9 may be set in operation by the application of a current symbolically represented by an arrow XB9 and coming from the decoding member 14. The earth switches IMX8, IMX9, IMY0 and IMY1 may be separately set in operation respectively by means of currents symbolically represented by arrows CX8, CX9, CY0 and CY1 and coming from the decoding member 14. Finally, a current symbolically represented by an arrow E1–1, corresponding to the value 1 of the information to be introduced into the store, makes it possible to break the circuit of the generator GE by actuating the switch IE.

If, for example, a binary datum of value 1 represented by the arrow E1–1 is to be stored in the core T18, while all the cores are assumed to be initially in the state 0, the decoding member 14 sends the current YB0, XB9, CX8 and CY1. Under the action of the current YB0, the switch IAYB0 closes. The current XB9 closes the switch IAXB9, while the switches IMX8 and IMY1 close under the action of the currents CX8 and CY1 respectively. The generator 15 then sends the writing order EC–1, which closes the switches AEYB0 and AEXB9, and then the writing order EC–2 which closes the switches MEX8, MEX9, MEY0, MEY1 and ZE.

Since the earth switches IMX8 and MEX8 are closed, as also are the feed switches IAXB9 and AEXB9, a circuit is closed which extends through the generator GX, the switches IAXB9, AEXB9, the conductor X8, the switches MEX8, IMX8 and earth. Likewise, since the earth switches IMY1 and MEY1 are closed, as also are the feed switches IAYB0 and AEYB0, a circuit is closed which extends through the generator GY, the switches IAYB0, AEYB0, the conductor Y1, the switches MEY1, IMY1, and earth. Of the four conductors X8, X9, Y0 and Y1, only X8 and Y1 are then traversed by a current, and each of them generates a magnetic field +H in the cores through which they extend. Owing to the circuit breaking effected by the switch IE subjected to the action of the current E1–1, the conductor Z1 is not traversed by any current, so that the core T18, which alone is subjected to the action of a resultant field of value +2H, changes to the state 1. Had it been desired to store in this core the binary value 0, it would have been sufficient for no current E1–1 to act on the switch IE. The conductor Z1 would then have been traversed by a current emanating from the generator GE and generating a field —H in the four cores. This field —H, which is superimposed, in the core T18, on the field +2H produced by the conductors X8 and Y1, would then have produced a resultant field of value +H and the core T18 would have remained in the state 0.

In order to extract the binary value stored in the core T18, the decoding member 14 first transmits the currents YB0, XB9, CX8 and CY1. Under the action of these currents, the switches IAYB0, IAXB9, IMX8 and IMY1 close. The generator 15 then sends the reading order LE–1, which closes the switches ALYB0, ALXB9, and then the reading order LE–2, which closes the switches MLX8, MLX9, MLY0, MLY1 and ZL. It will then readily be appreciated that only the conductors X8 and Y1 are traversed by currents of opposite direction to those which were necessary for the recording. Consequently, these currents generate in the core T18 a resultant field of value —2H. If the core was initially in the state 0, nothing occurs, while if it was in the state 1, i.e., if it contained a binary value 1, this field causes it to change from the state 1 to the state 0. Consequently, a pulse is set up in the extraction wire L1–1.

It is to be noted that the reading orders LE–1 and LE–2, or the writing orders EC–1 and EC–2, close the corresponding switches only for the time necessary for the extraction or the introduction of a character or of a group of characters from or into the store.

DESCRIPTION OF THE MACHINE

General structure of the store

Figure 3A:
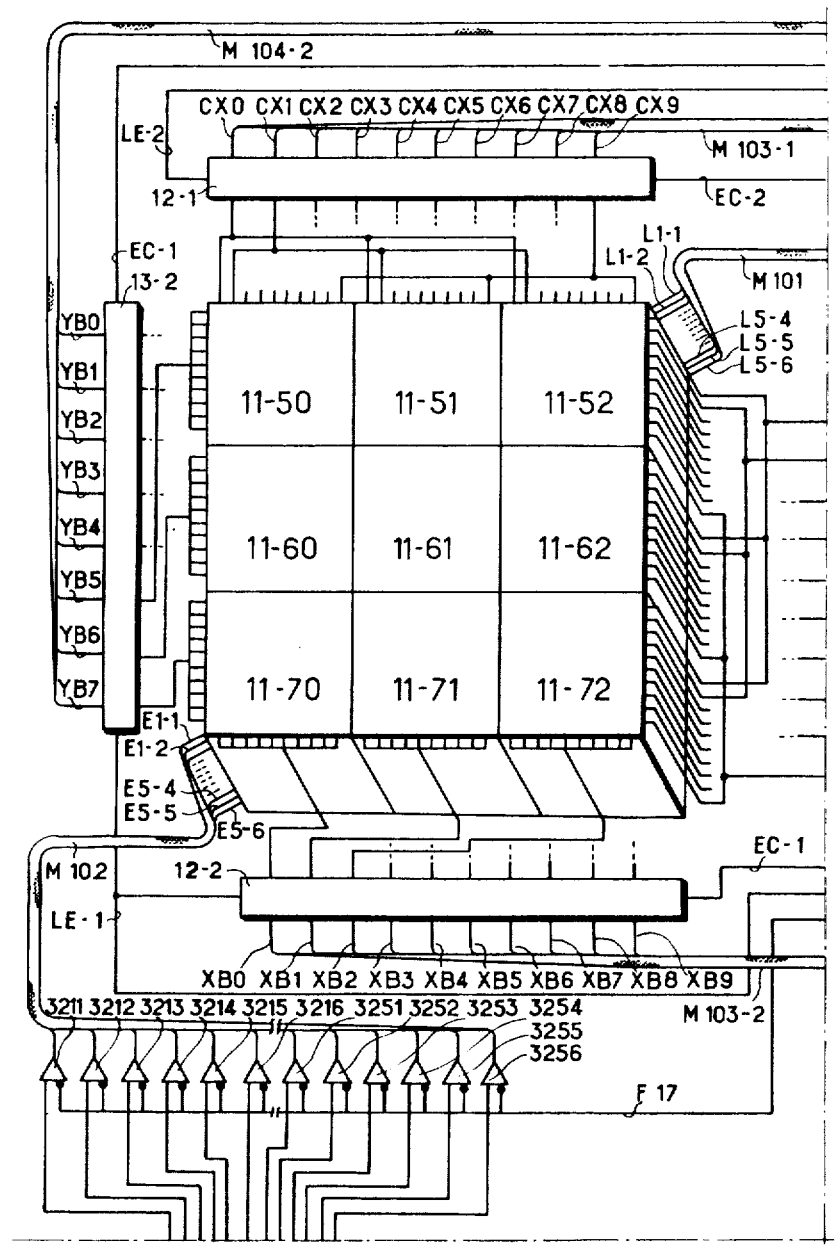
Figure 3B:
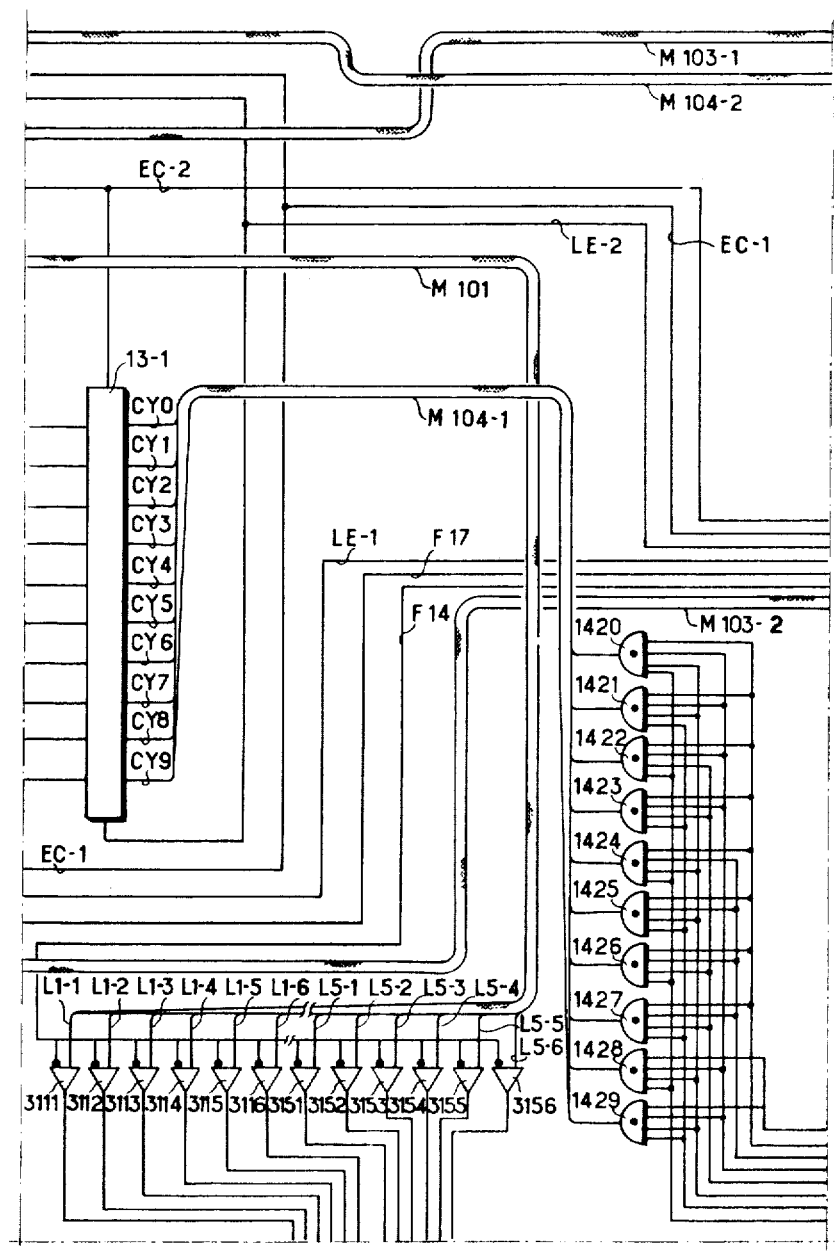

There will now be described the general structure of the store 11. Before a detailed description of the machine is entered upon, it is important to recall that the cores T8, T9, T18 and T19 of FIGURE 2 are all situated in a common plane or stage of the store. The store 11 described by way of example consists of thirty superimposed stages of cores, each stage comprising 8000 cores arranged in lines and rows. The cores situated one above the other in each stage form a column of thirty cores. Since each character is introduced into the store in accordance with a code comprising six binary positions, six cores will be required to represent the said character in the store. In this way, a column of thirty cores can store five characters, and the store may in effect be regarded as being formed of 8000 columns of five characters, which 8000 columns are contained in eighty blocks, each block being thus formed of one hundred columns. In each of the stages of each block, the cores are disposed at the points of intersection of ten horizontal conductors Y0 to Y9 and of ten vertical conductors X0 to X9. In FIGURE 3a, there will be seen a store of eighty blocks, of which only nine 11–50, 11–51, 11–52, 11–60, 11–61, 11–62, 11–70, 11–71 and 11–72 are shown. In order to permit the selection of a column, four half-selectors 12–1, 12–2, 13–1 and 13–2 are used. These half-selectors have been shown in FIGURES 3a and 3b. The selector X, denoted by the reference 12 in FIGURE 1, will consist of two half-selectors 12–1 and 12–2, and the selector Y, denoted by the reference 13 in FIGURE 1, will consist of the two-half selectors 13–1 and 13–2. The half-selector 12–2 formed, as may be seen from FIGURES 2 and 3a, of ten feed switches IAXB0 to IAXB9 set in operation by currents XB0 to XB9, respectively, of ten writing switches AEXB0 to AEXB9 and of ten reading switches ALXB0 to ALXB9, permits of connecting to the positive source of the generator GX all the conductors X belonging to the eight blocks denoted by a reference terminating in an identical digit, for example all the conductors X of the blocks 11–02, 11–12, 11–22, 11–32, 11–42, 11–52, 11–62 and 11–72. Similarly, the half-selector 13–2 formed, as may be seen from FIGURES 2 and 3a, of eight feed switches IAYB0 to IAYB7 set in operation by currents YB0 to YB7 respectively, of eight writing switches AEYB0 to AEYB7 and of eight reading switches ALYB0 to ALYB7, permits of connecting to the positive source of the generator GY all the conductors Y belonging to the ten blocks denoted by references written with identical penultimate digits, for example all the conductors Y of the blocks 11–70, 11–71, 11–72, 11–73, 11–74, 11–75, 11–76, 11–77, 11–78 and 11–79. The half-selector 12–1 formed, as may be seen from FIGURES 2 and 3a, of thirty earth switches IMX0 and IMX9 (set in operation by currents CX0 to CX9, respectively), MEX0 to MEX9 and MLX0 to MLX9, permits of earthing in each block one of the ten conductors X0 to X9. Likewise, the half-selector 13–1 formed of thirty earth switches IMY0 to IMY9 (set in operation by currents CY0 to CY9, respectively), MEY0 to MEY9 and MLY0 to MLY9, permits of earthing in each block one of the ten conductors Y0 to Y9. With the obvious object of simplification, all the switches of half-selectors have been omitted from FIGURE 2. When the four half-selectors are each subjected to the action of one of the currents XB0 to XB9, YB0 to YB7, CX0 to CX9 and CY0 to CY9, all the conductors X0 to X9 and Y0 to Y9 of the thirty stages of one of the eighty blocks are brought into contact with the positive terminals of the generators GX and GY, while one of the said line conductors X0 to X9 and one of the said row conductors Y0 to Y9, in each of these stages, are earthed. In each stage, a current then flows through each of these two latter conductors and one column of cores is selected. In FIGURES 3a and 3b, the four half-selectors have been symbolically represented by rectangles. In order to simplify the drawings, the generators GX, GY and GE, the switches ZL, ZE and IE and the earth connections have been omitted from these figures. With a similar view to simplification, only the reading conductors between the four half-selectors and the store have been shown in these figures, but it will be assumed that these reading conductors are in fact paired with conductors serving for the writing. The conductors serving to carry the currents XB0 to XB9, YB0 to YB7, CX0 to CX9, and CY0 to CY9, are so grouped in some parts of FIGURES 3a and 3b as to form respectively four sets of conductors M103–2, M104–2, M103–1 and M104–1, all of which extend from the decoding member 14. Six conductors E1–1 to E1–6 serve to introduce into the store the six binary digits representing the encoded combination of a character, while six conductors L1–1 to L1–6 serve for the extraction of the said combination from the store. The recording of five characters in a store column will be effected simultaneously by means of thirty conductors E1–1 to E1–6, E2–1 to E2–6, E3–1 to E3–6, E4–1 to E4–6 and E5–1 and E5–6, while the extraction of the said characters will take place simultaneously by means of thirty conductors L1–1 to L1–6, L2–1 to L2–6, L3–1 to L3–6, L4–1 to L4–6 and L5–1 to L5–6, these conductors being so grouped as to form the two sets of conductors M101 to M102 respectively. The set of conductors M101 leads to a group of thirty coincidence circuits designated 3111 to 3116, 3121 to 3126, 3131 to 3136, 3141 to 3146, and 3151 to 3156 and constituting the transmitting member 31 of FIGURE 1. For the purpose of simplification, only the members 3111 to 3116 and 3151 to 3156 having the object of transmitting, respectively, the encoded combinations of the first and fifth characters have been shown in FIGURE 3b. This mode of representation has been adopted in FIGURE 3a for the thirty coincidence members 3211, 3212, 3213 . . . 3254, 3255 and 3256 constituting the transmitting member 32, and from which the set of conductors M102 extends.

*Decoding member*

Figure 3C:
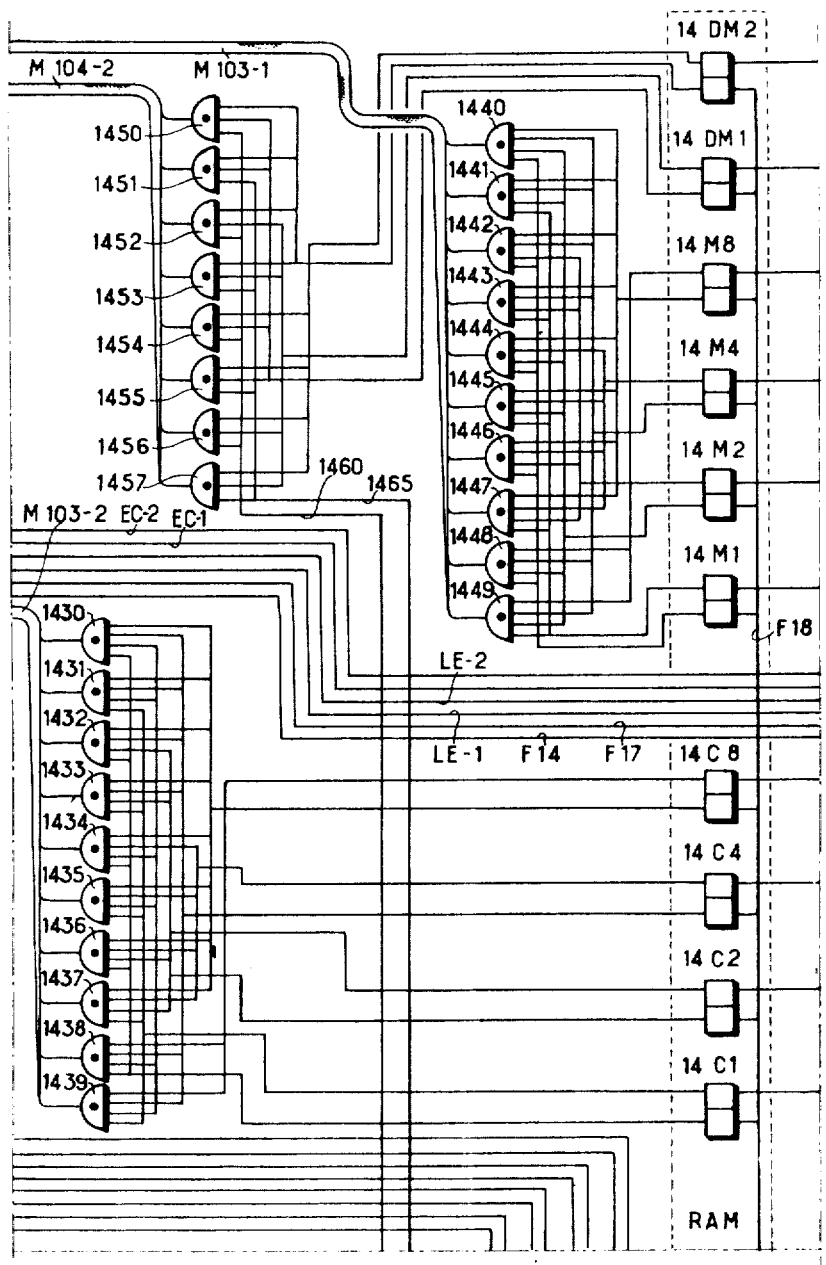
Figure 3:
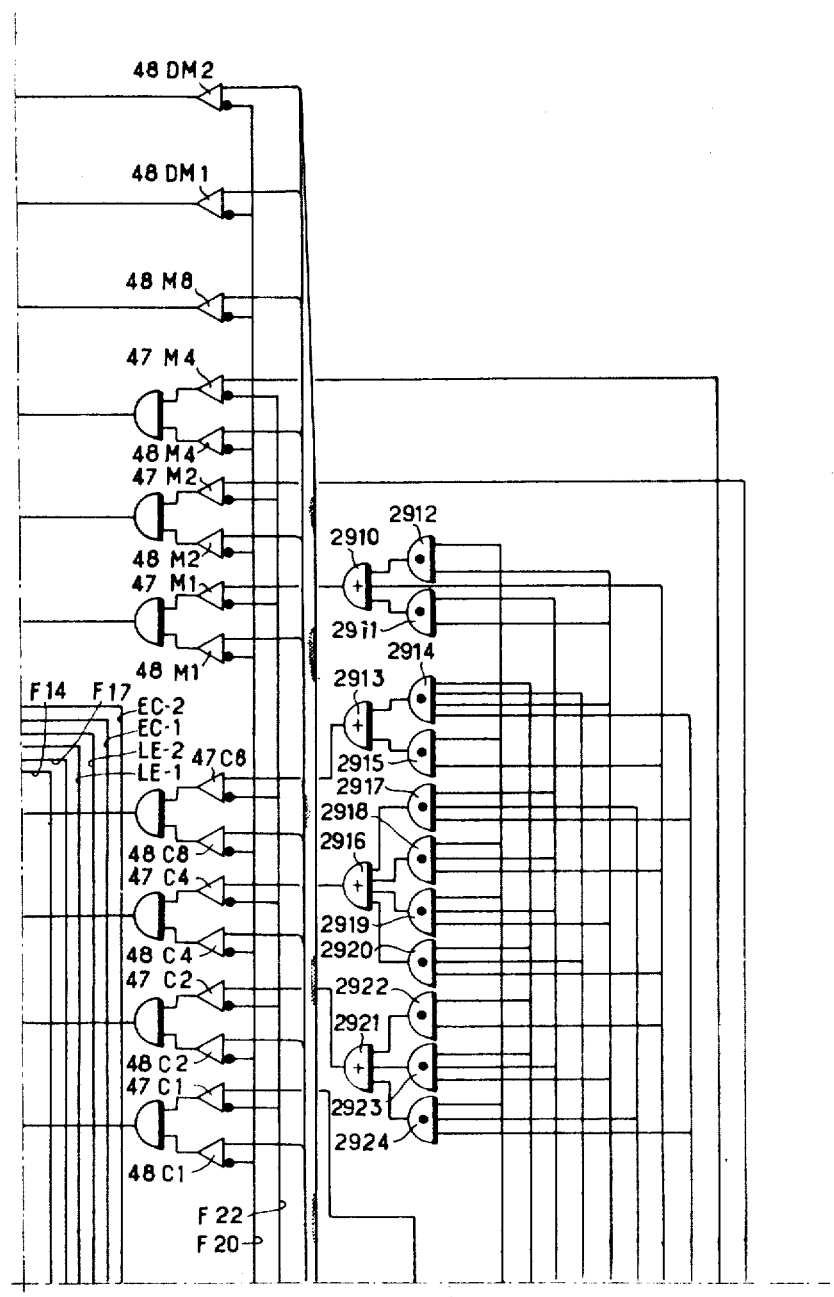
Figure 3E:
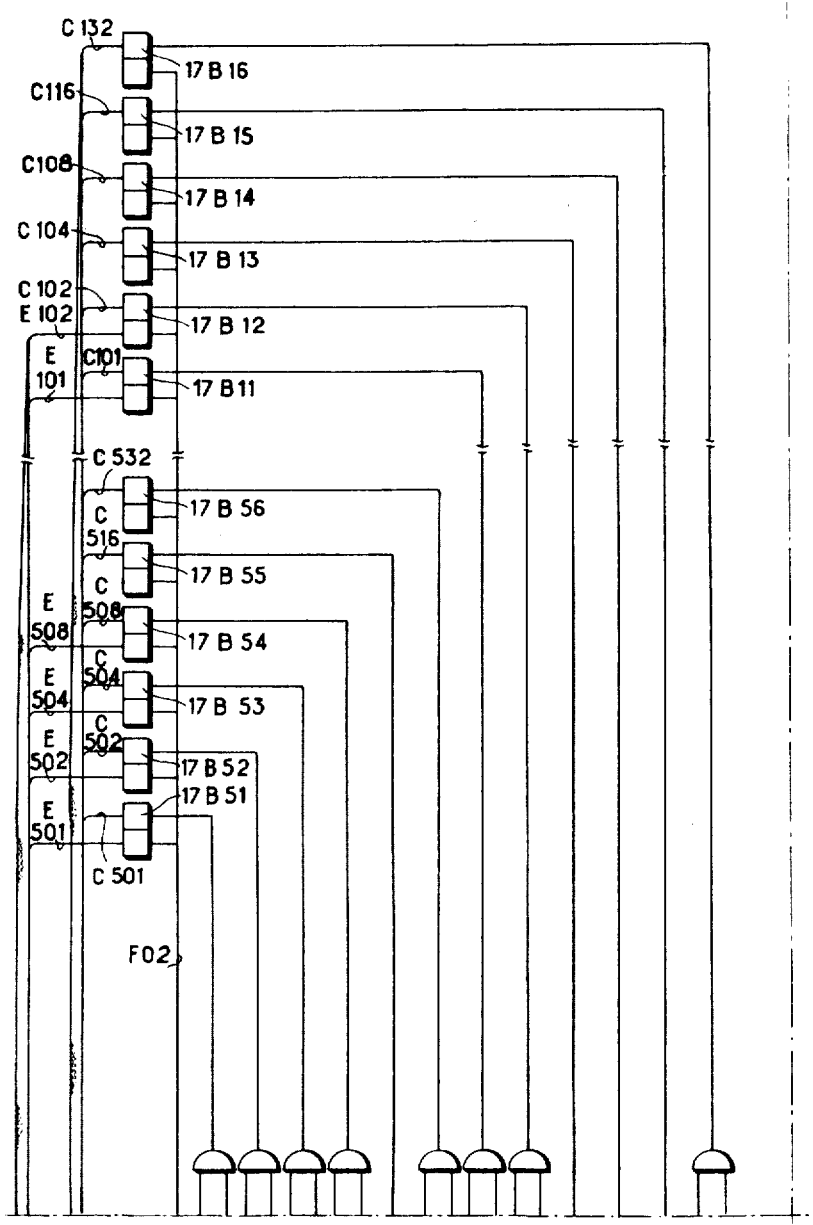
Figure 3F:
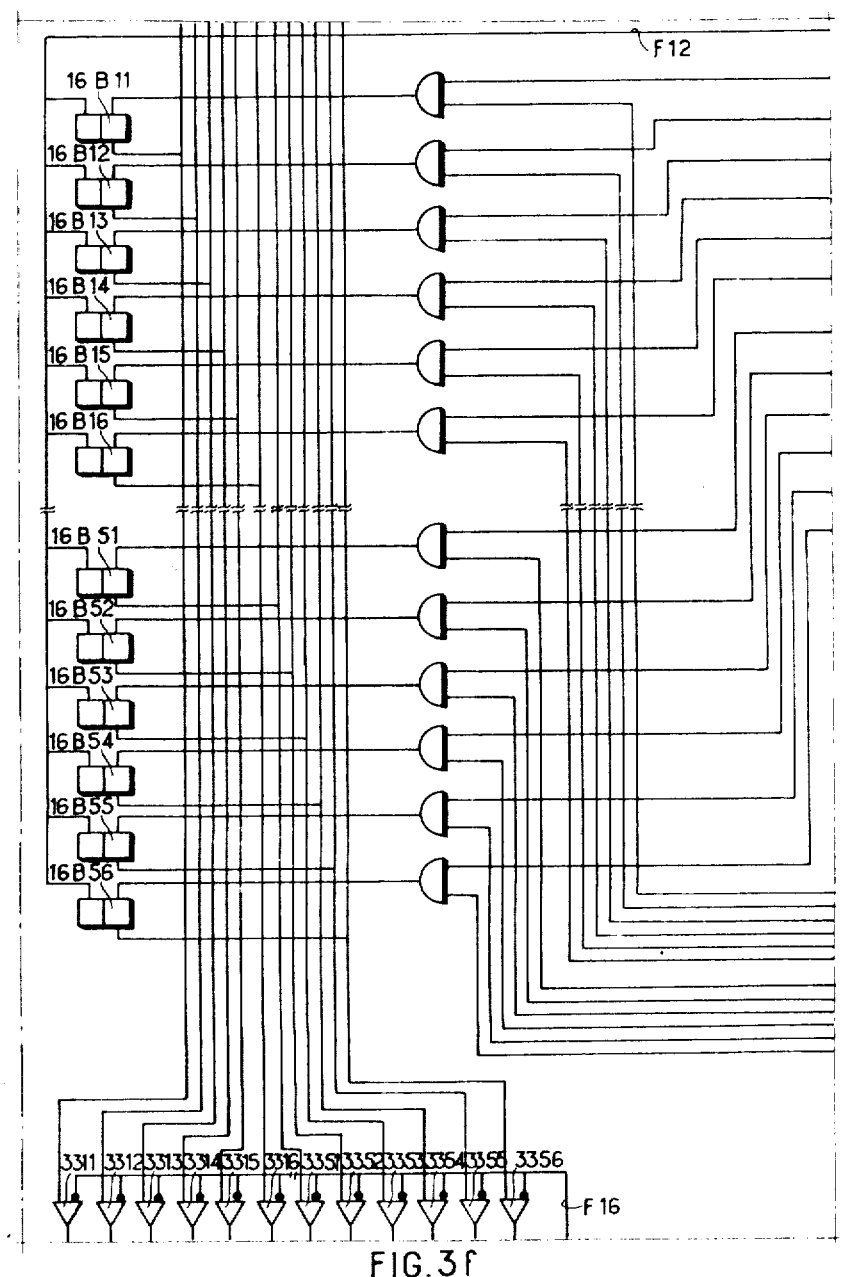
Figure 3G:
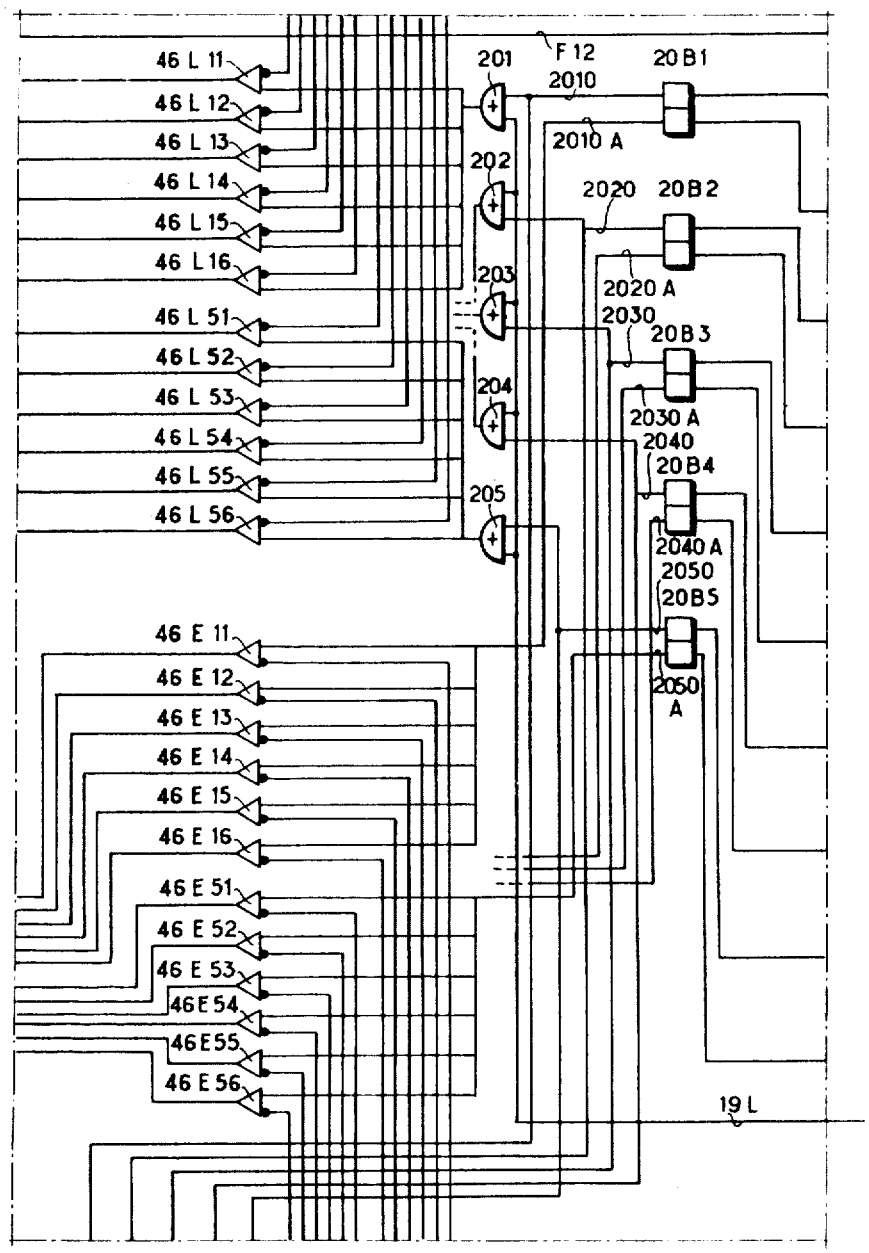
Figure 3H:
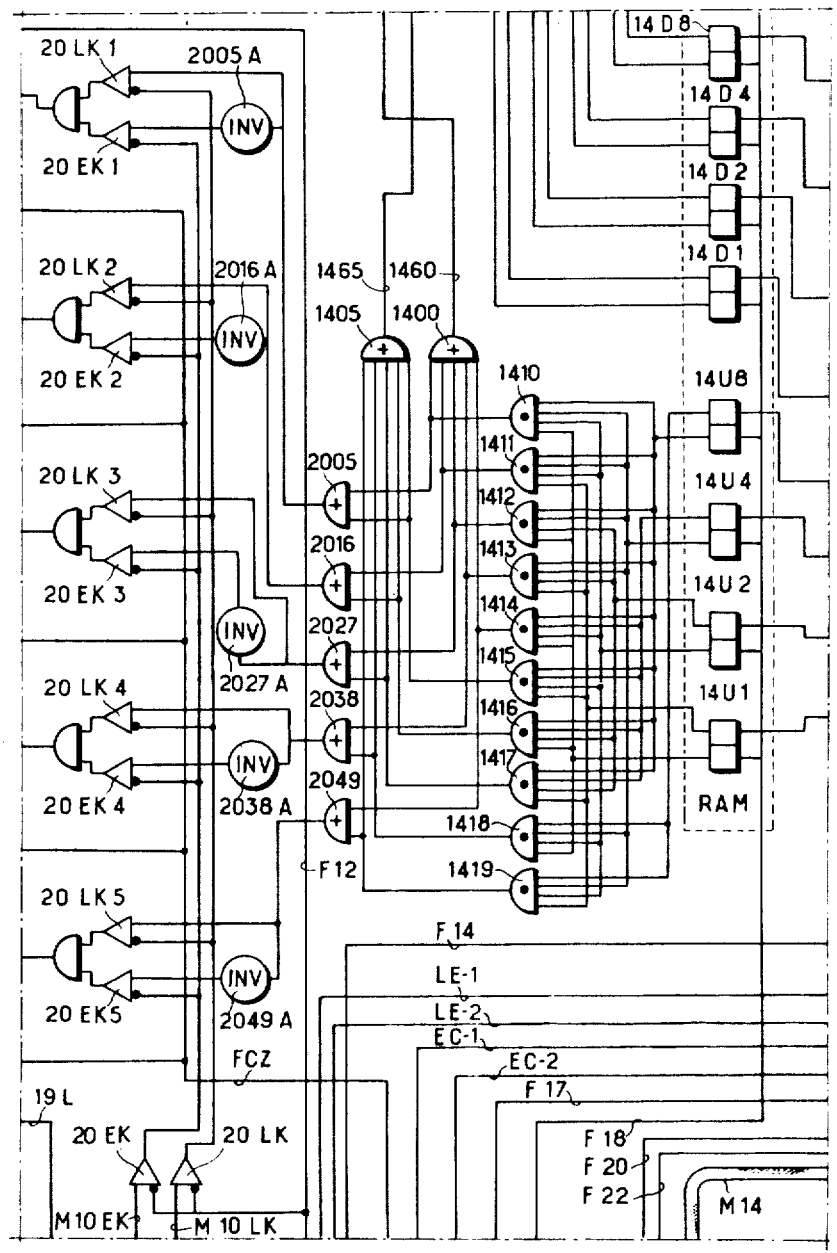
Figure 3I:
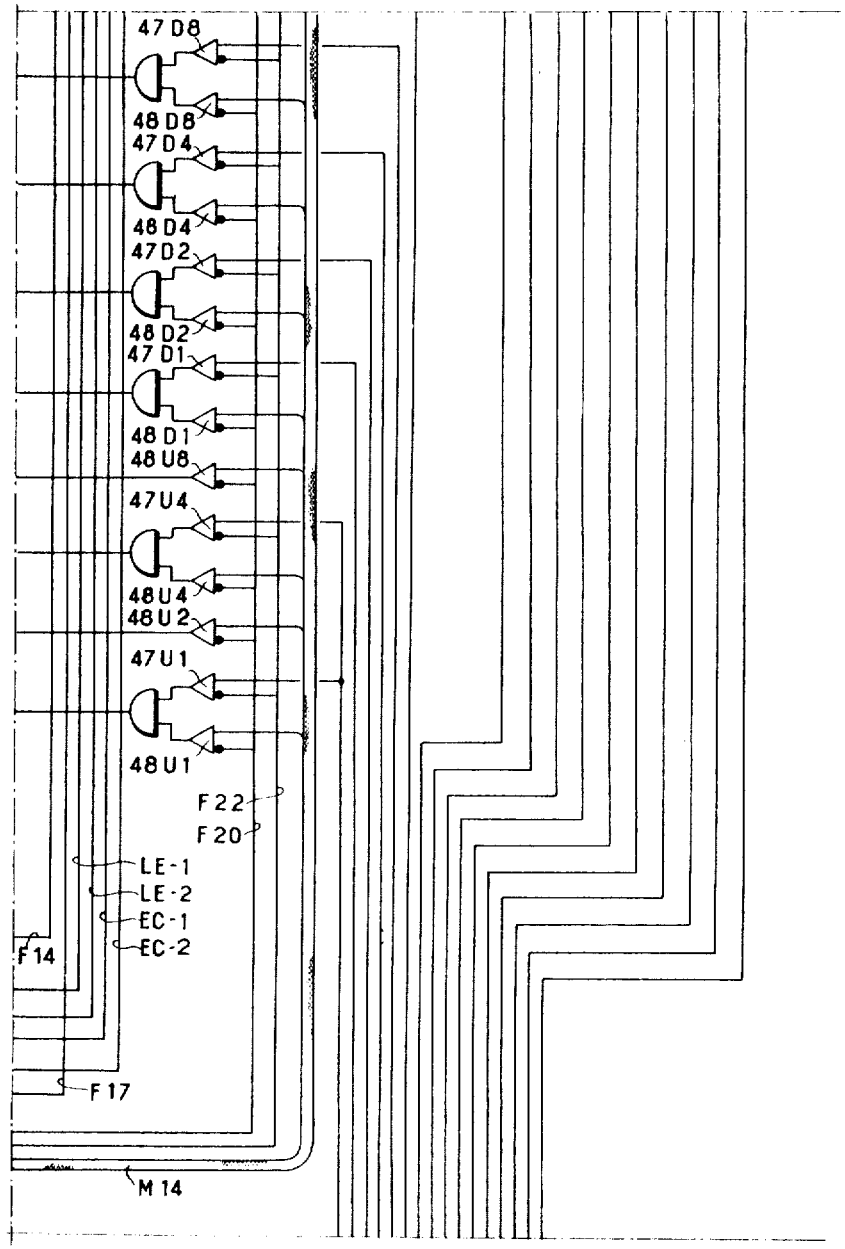

In FIGURES 3b, 3c and 3h, the members whose references commence with 14 form part of the decoding member 14.

The address of a character which is to be extracted from the store consists of five decimal digits encoded in accordance with the well-known binary code called the "binary encoded decimal" or code 8–4–2–1. Each of the decimal digits of the address is therefore represented in this code by a combination of four binary digits. As may be seen from FIGURES 3b, 3c and 3h, the units digit of the address may be stored in its encoded binary form in four flip-flops 14U1, 14U2, 14U4 and 14U8. The tens digit may be stored in four flip-flops 14D1, 14D2, 14D4 and 14D8, the hundreds digit may be stored in four flip-flops 14C1, 14C2, 14C4, 14C8, and the thousands digit may be stored in four flip-flops 14M1, 14M2, 14M4 and 14M8. Finally, two additional flip-flops 14DM1 and 14DM2 are sufficient to store the ten-thousands digit, which is never higher than the decimal digit 3, since the address is always comprised between 00000 and 39999. All these flip-flops constitute a register called the store address register RAM and can be returned to zero by means of an order F18 coming from the order generator 15, which generator is illustrated in FIGURE 3n. Each of the decimal digits contained in their encoded form in the flip-flops of the register RAM is decoded by members consisting of AND circuits 1410 to 1457 which are shown in FIGURES 3b, 3c and 3h, and so disposed that only one of the AND circuits 1410 to 1419 supplies at its output a positive voltage, the said voltage being set up at the output of the circuit 1410 if the units digit contained in the flip-flops 14U1, 14U2, 14U4, 14U8 is 0, at the output of the circuit 1411 if this digit is 1, at the output of the circuit 1412 if this digit is 2 . . . and at the output of the circuit 1419 if this digit is 9. Similarly, the AND circuits 1420 to 1429 are intended to decode the tens digit, the AND circuits 1430 to 1439 are intended to decode the hundreds digit and the AND circuits 1440 to 1449 are intended to decode the thousands digit. An OR circuit 1400 disposed at the output of the AND circuits 1410 to 1414 supplies a positive voltage at its output through a conductor 1460 each time the units digit is between 0 and 4. An OR circuit 1405 disposed at the output of the AND circuits 1415 to 1419 supplies a positive voltage at its output through a conductor 1465 each time the units digit is between 5 and 9. The AND circuits 1450 to 1457 effect a separate decoding of the voltages supplied by the outputs of the flip-flops 14DM1 and 14DM2 and the conductors 1460 and 1465. The decoding effected by these AND circuits is as follows:

| Address | | | | | AND circuit whose output is at a positive voltage |
|---|---|---|---|---|---|
| DM | M | C | D | U | |
| 0 | 0 to 9 | 0 to 9 | 0 to 9 | 0 to 4 | 1450 |
| 0 | do | do | do | 5 to 9 | 1451 |
| 1 | do | do | do | 0 to 4 | 1452 |
| 1 | do | do | do | 5 to 9 | 1453 |
| 2 | do | do | do | 0 to 4 | 1454 |
| 2 | do | do | do | 5 to 9 | 1455 |
| 3 | do | do | do | 0 to 4 | 1456 |
| 3 | do | do | do | 5 to 9 | 1457 |

The voltages resulting from the decoding effected on the address of the register RAM are thereafter sent to the half-selectors 12–1, 12–2, 13–1 and 13–2.

*Order register*

Figure 3J:
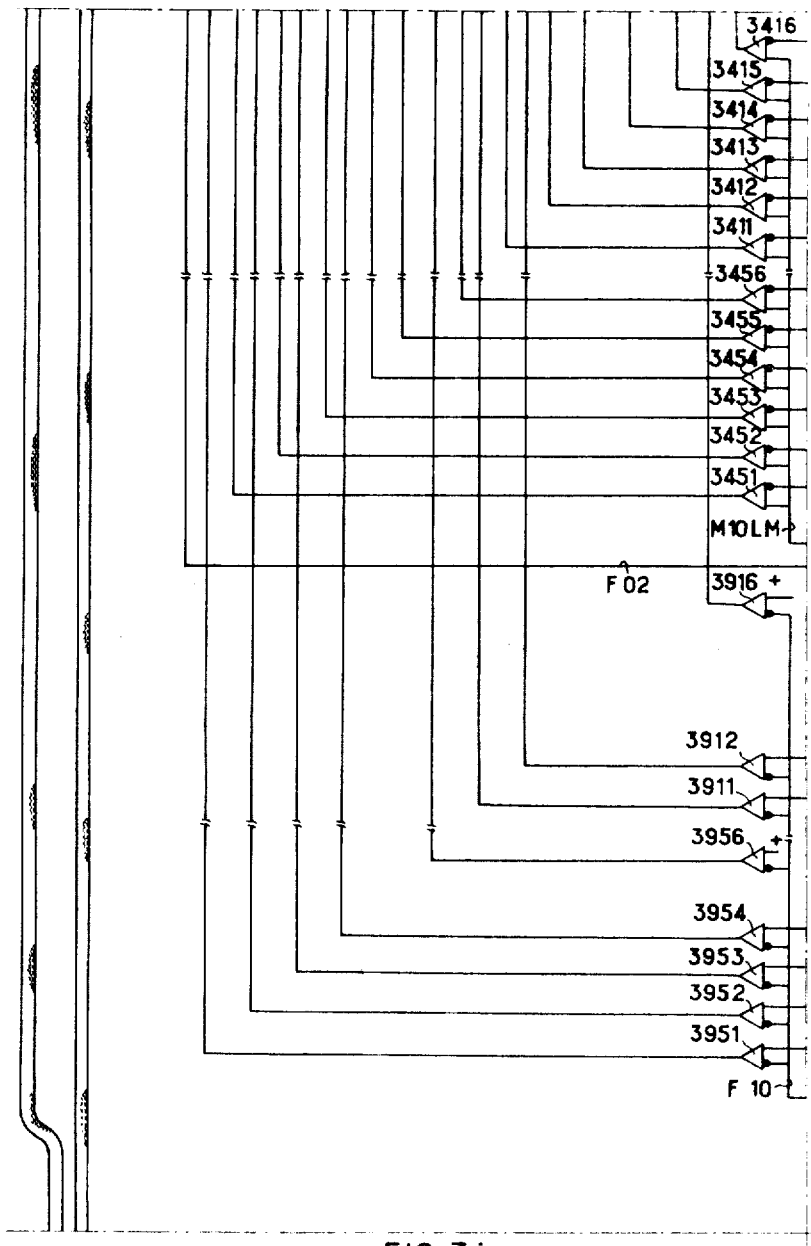
Figure 3K:
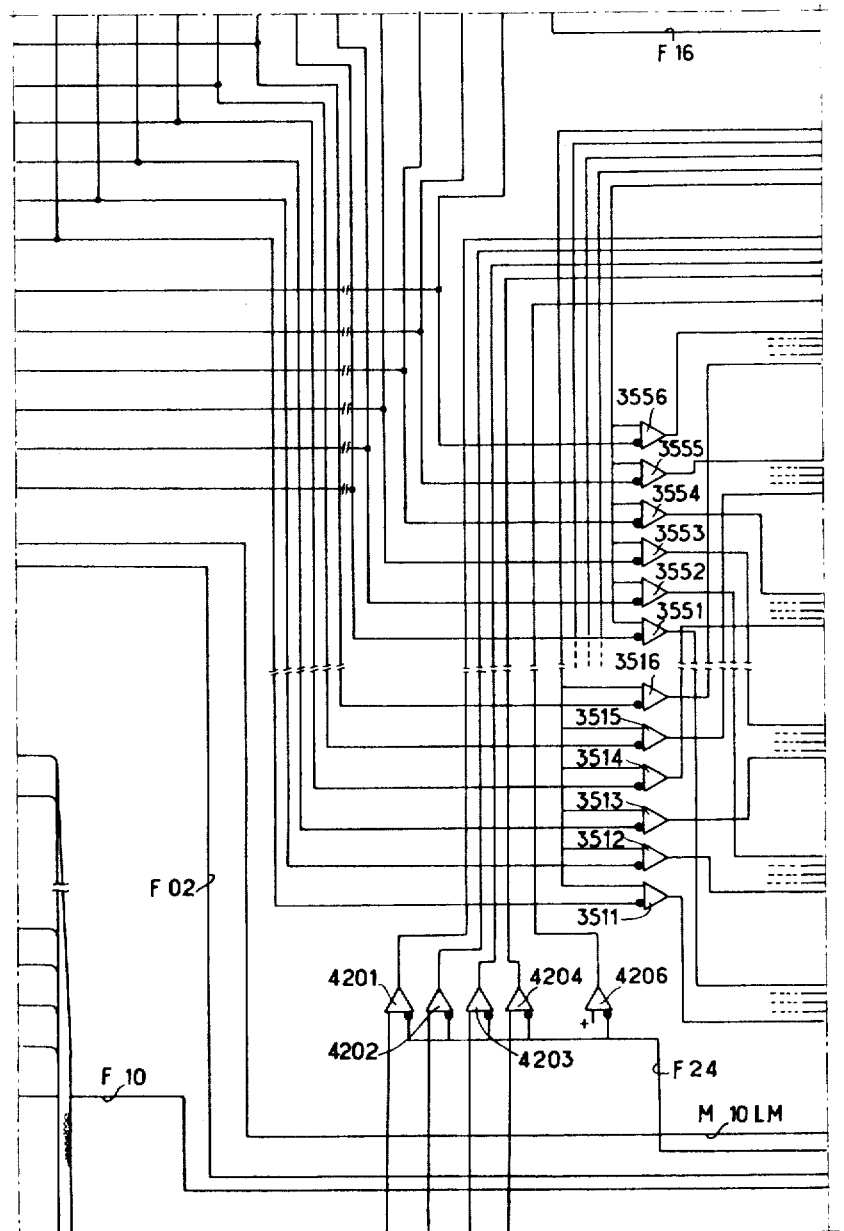
Figure 3M:
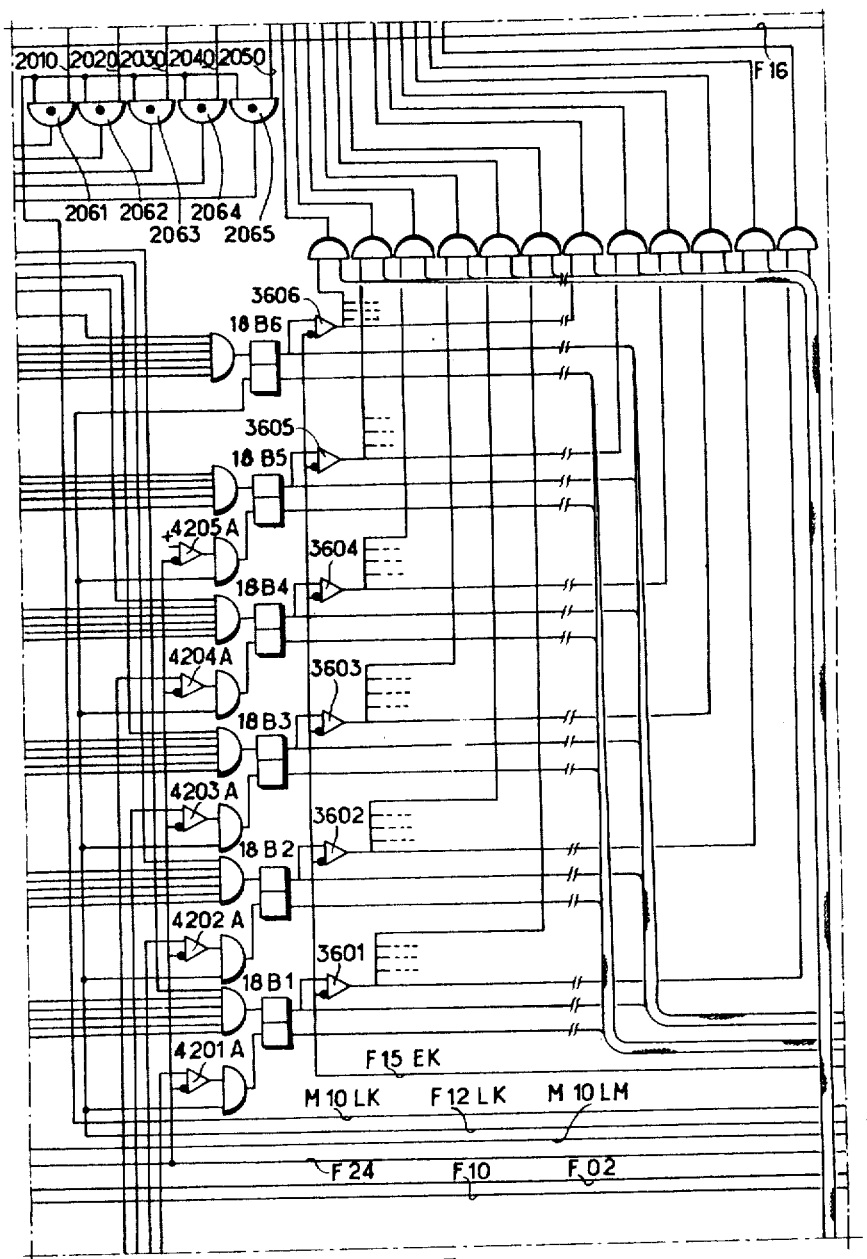
Figure 3N:
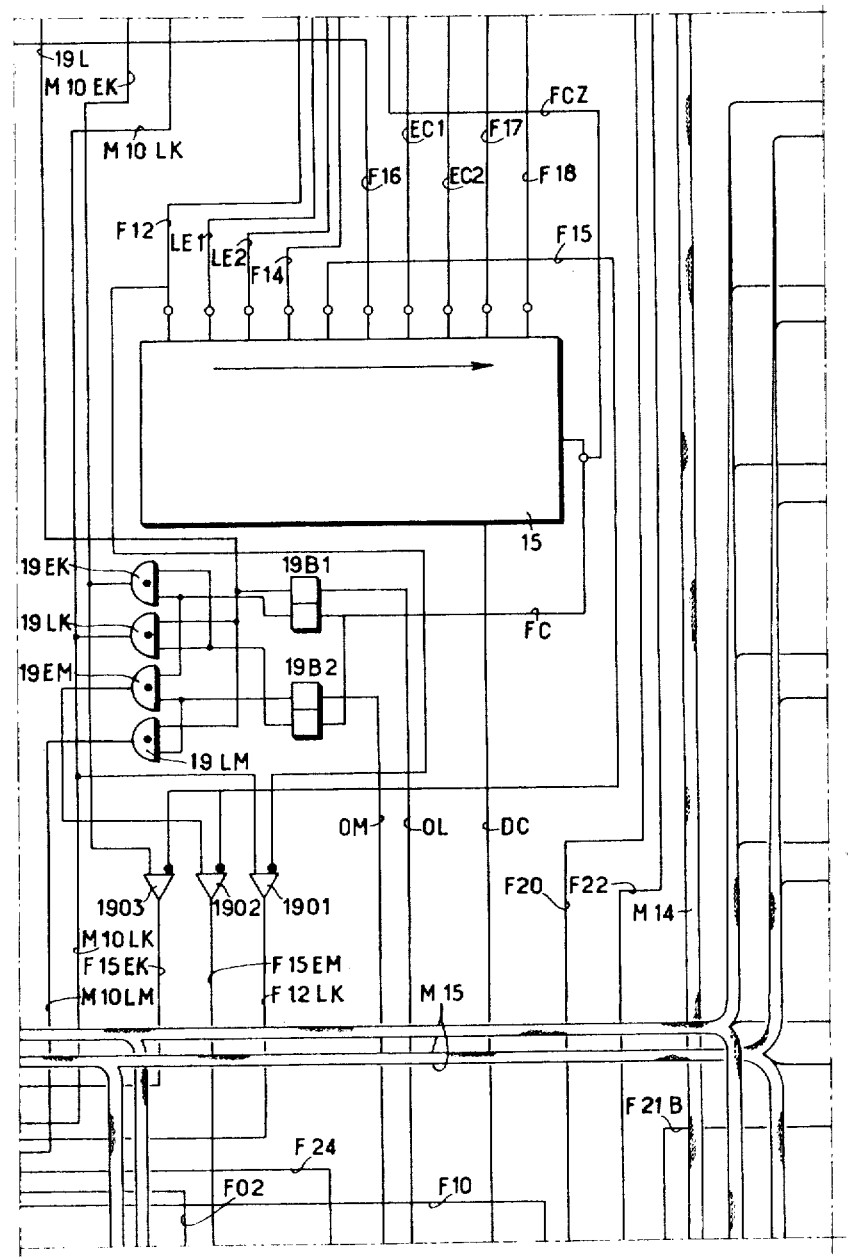
Figure 3P:
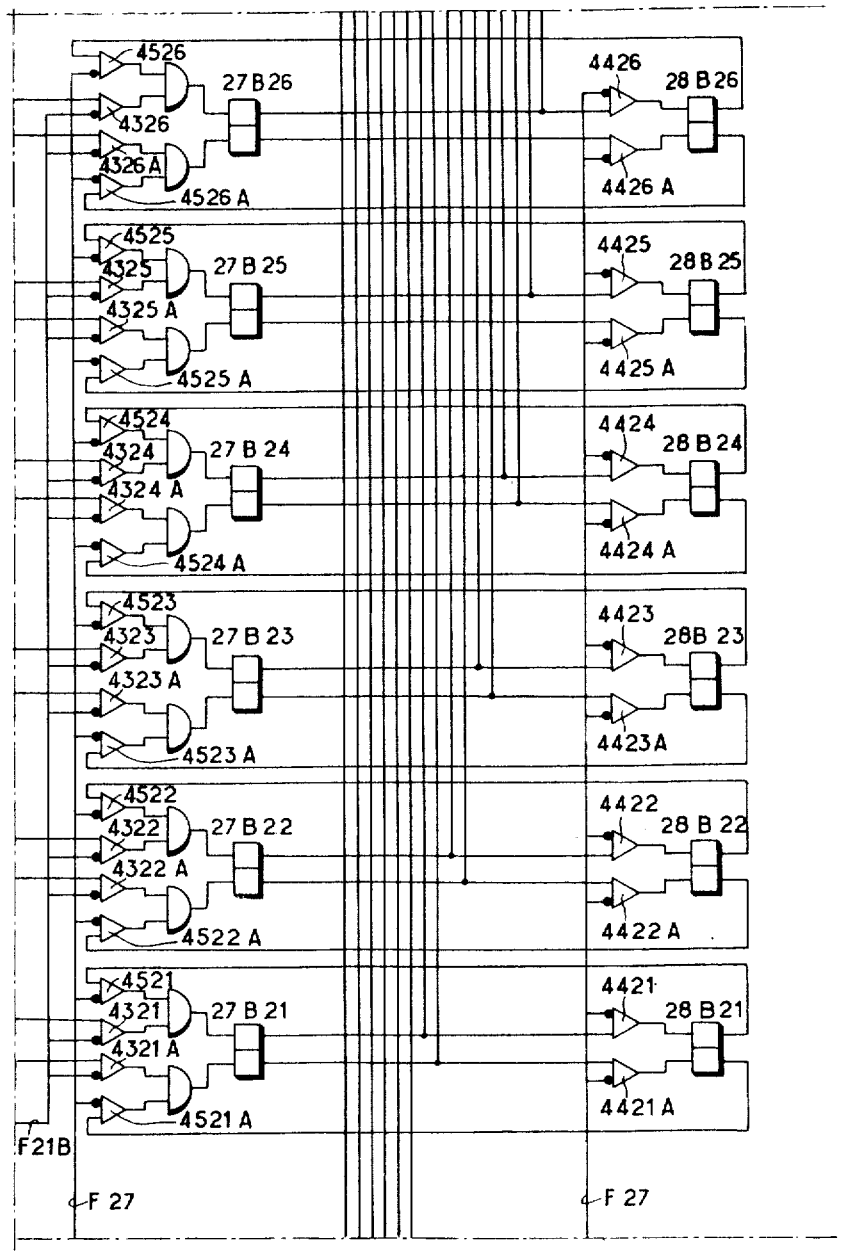
Figure 3Q:
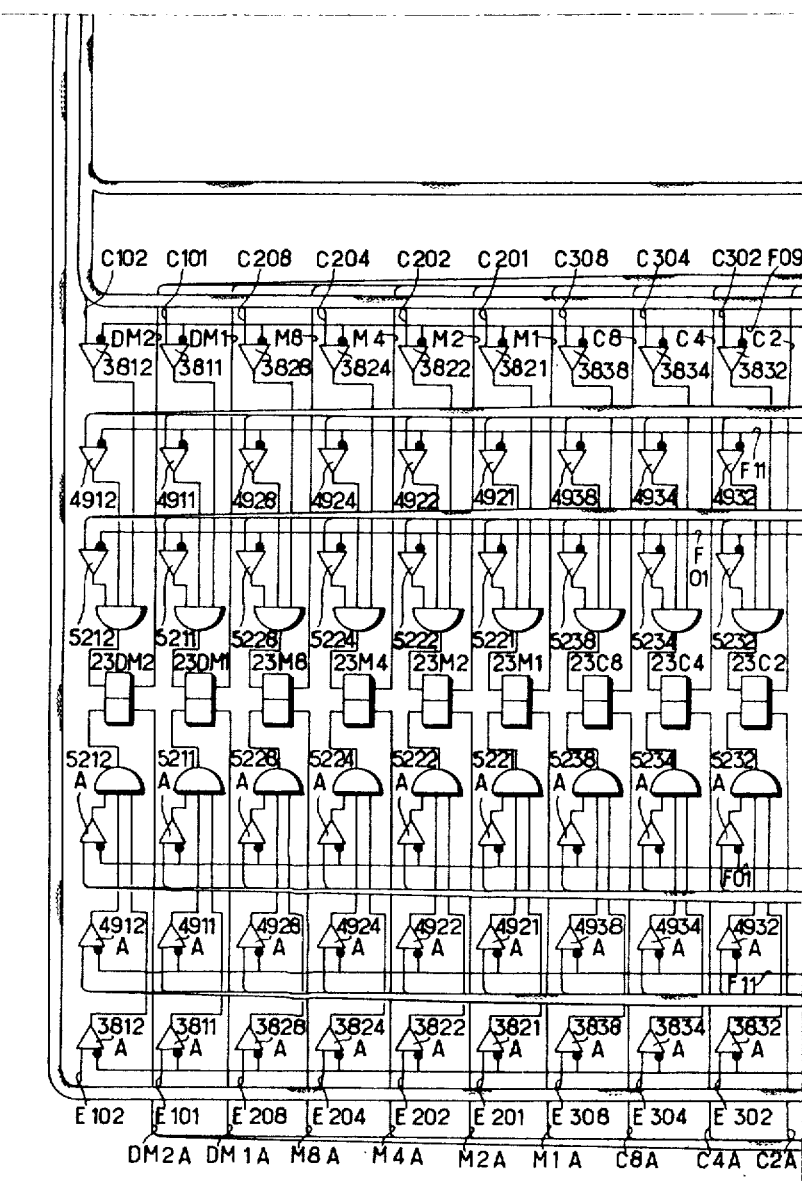
Figure 3R:
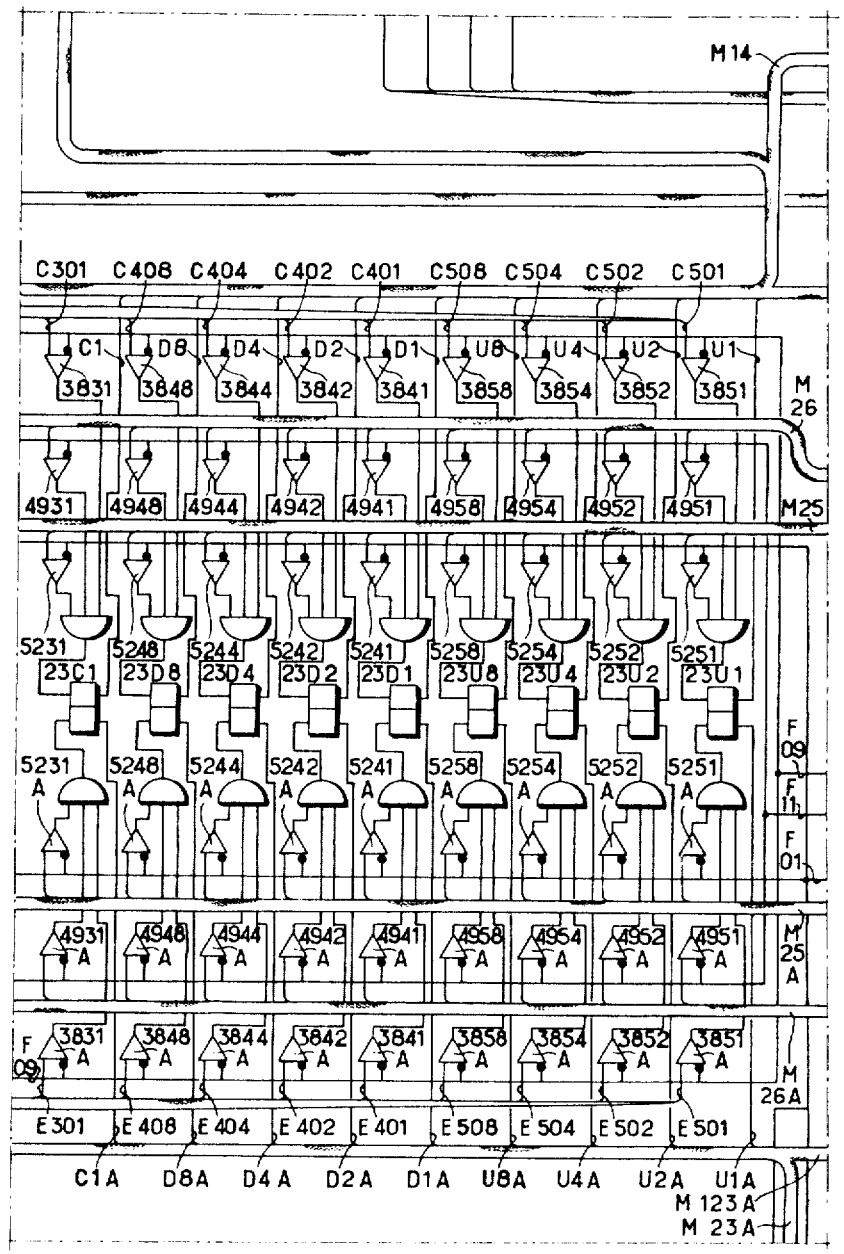
Figure 3S:
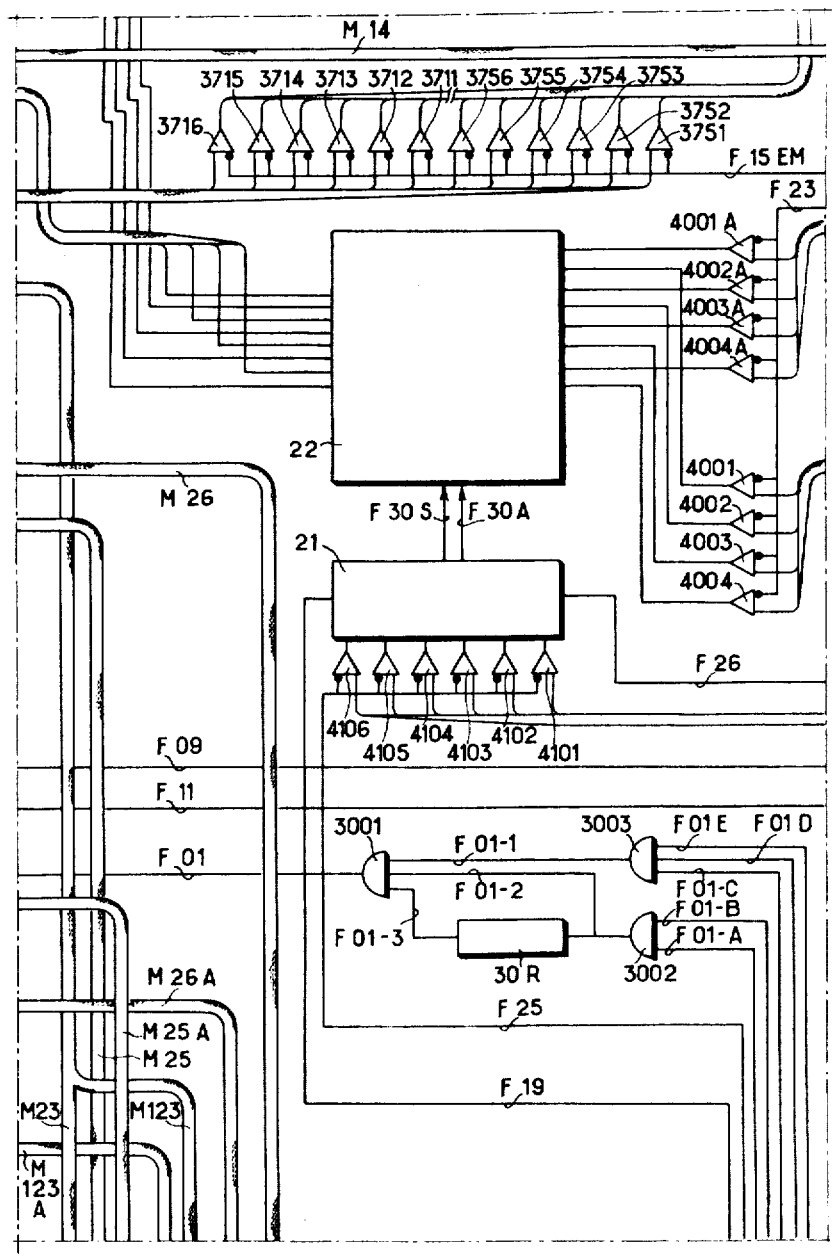
Figure 3T:
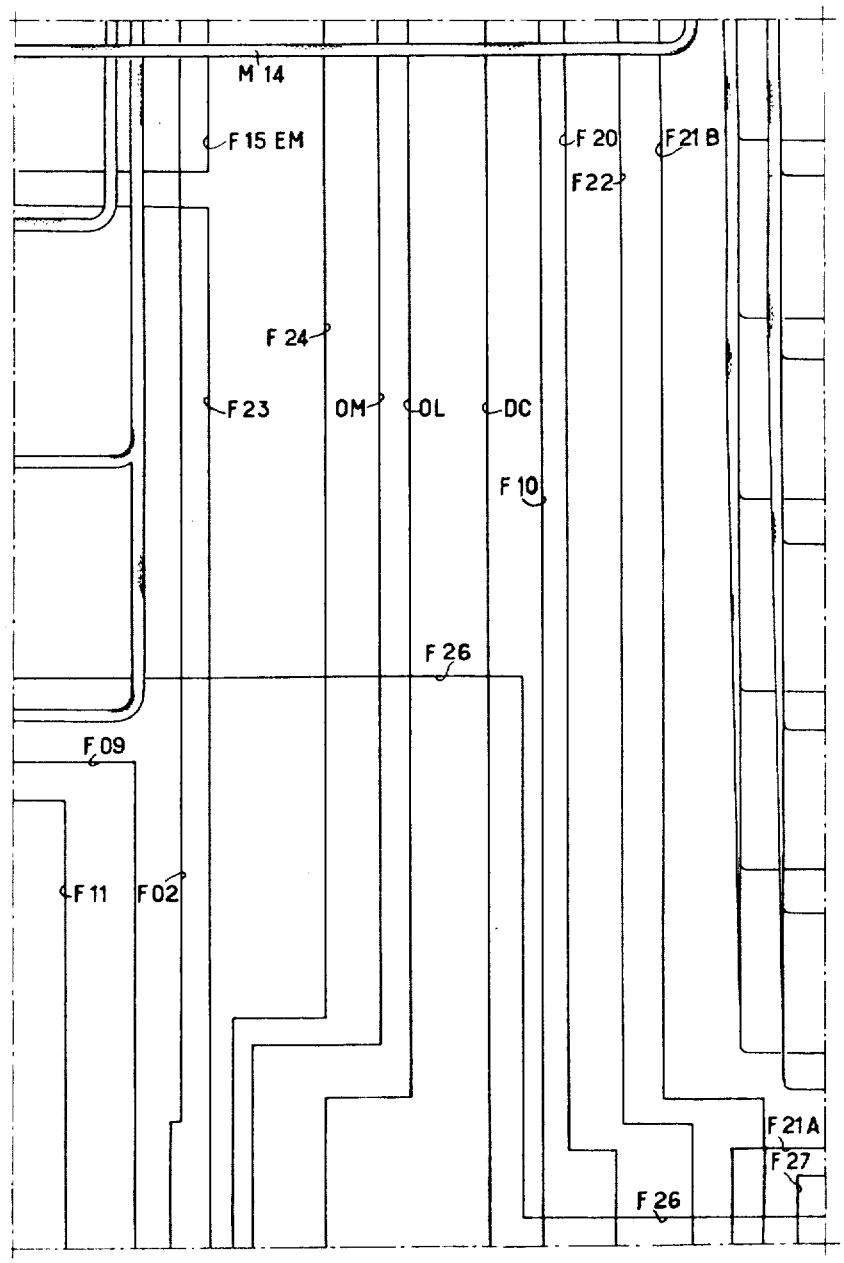
Figure 3U:
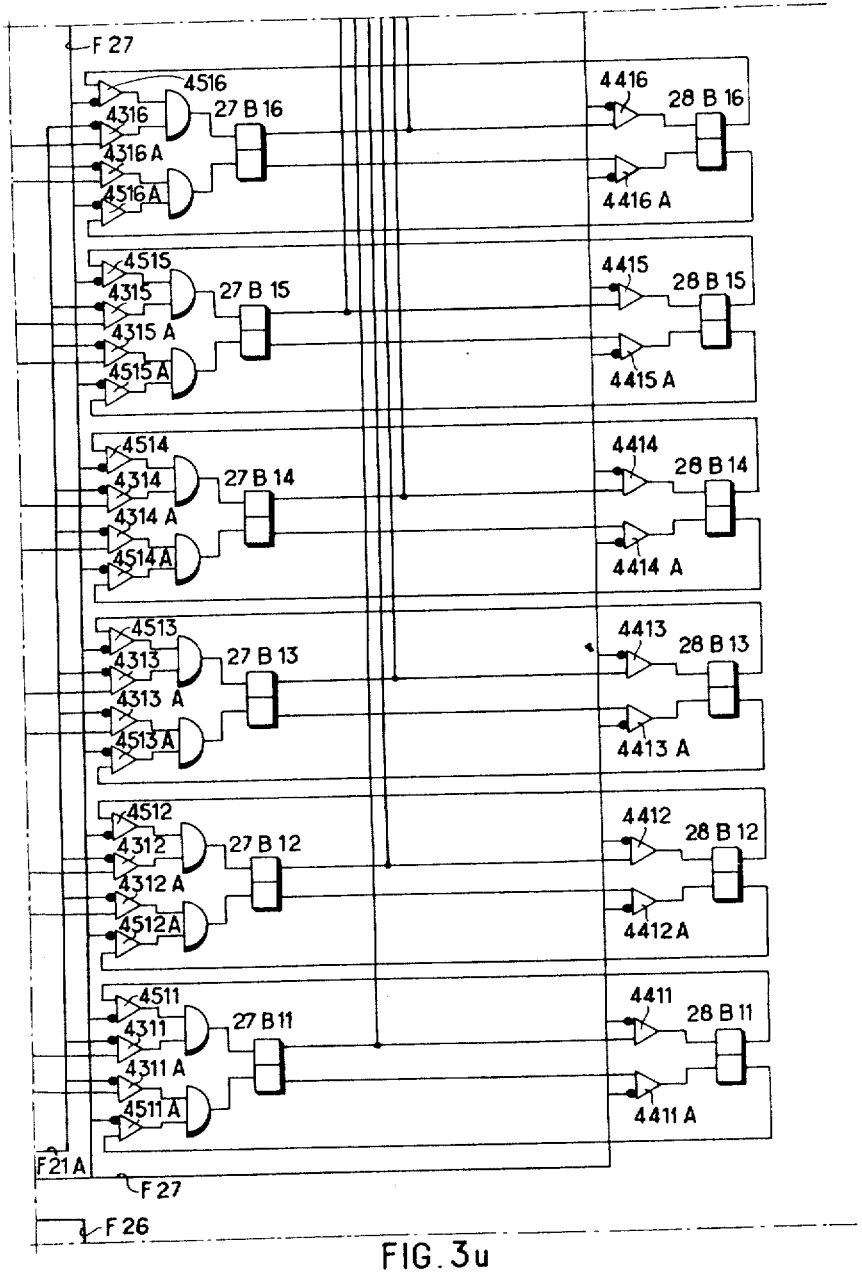
Figure 3V:
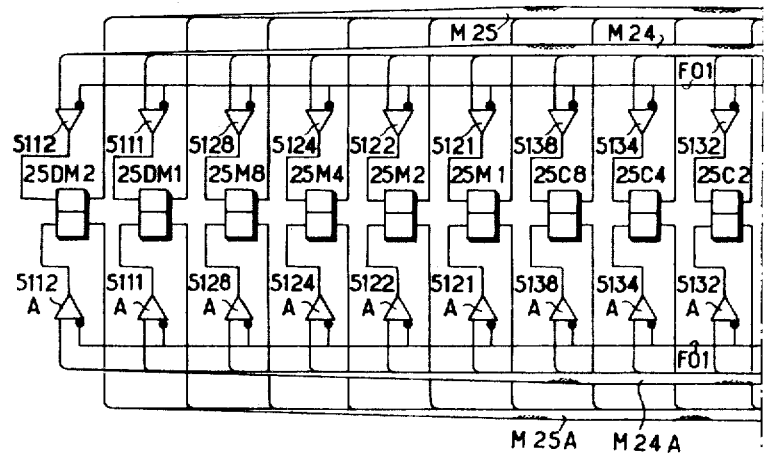
Figure 3V:
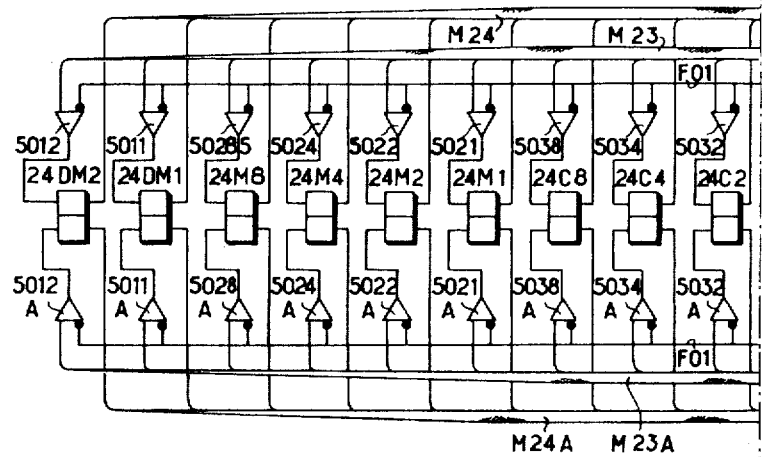
Figure 3W:
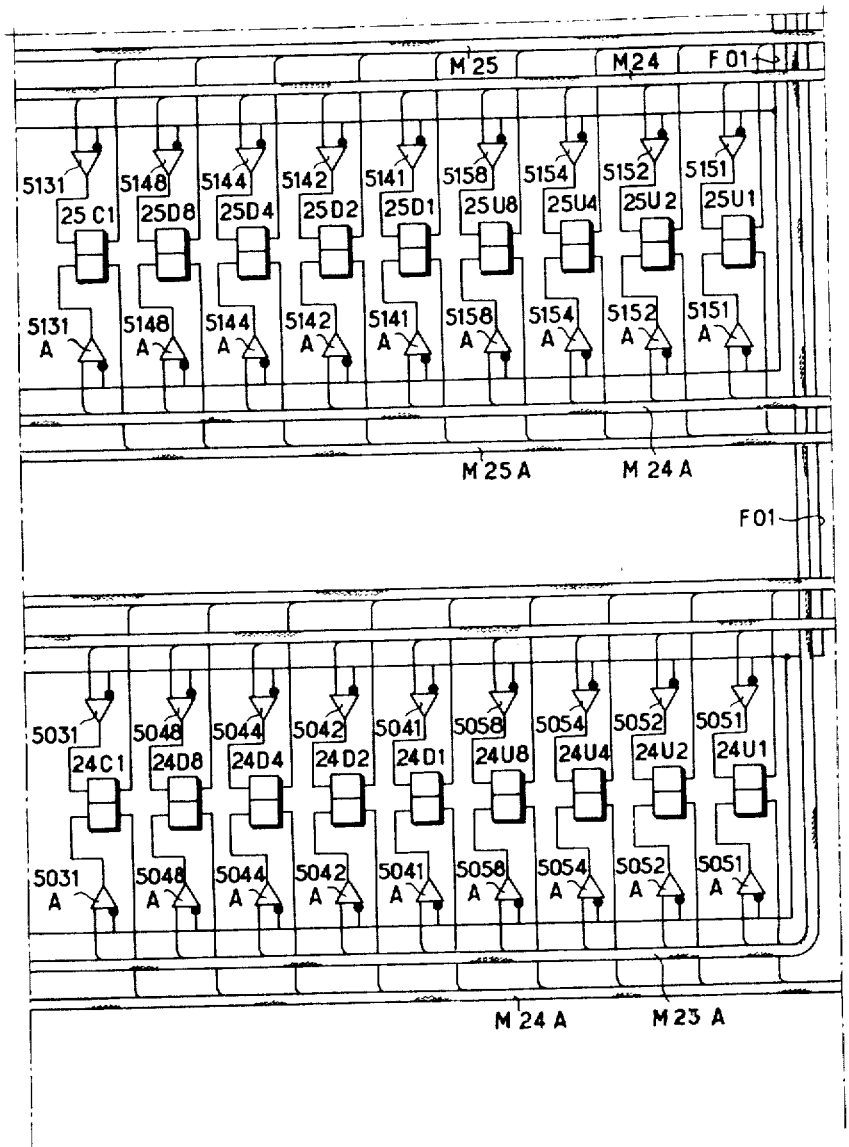
Figure 3X:
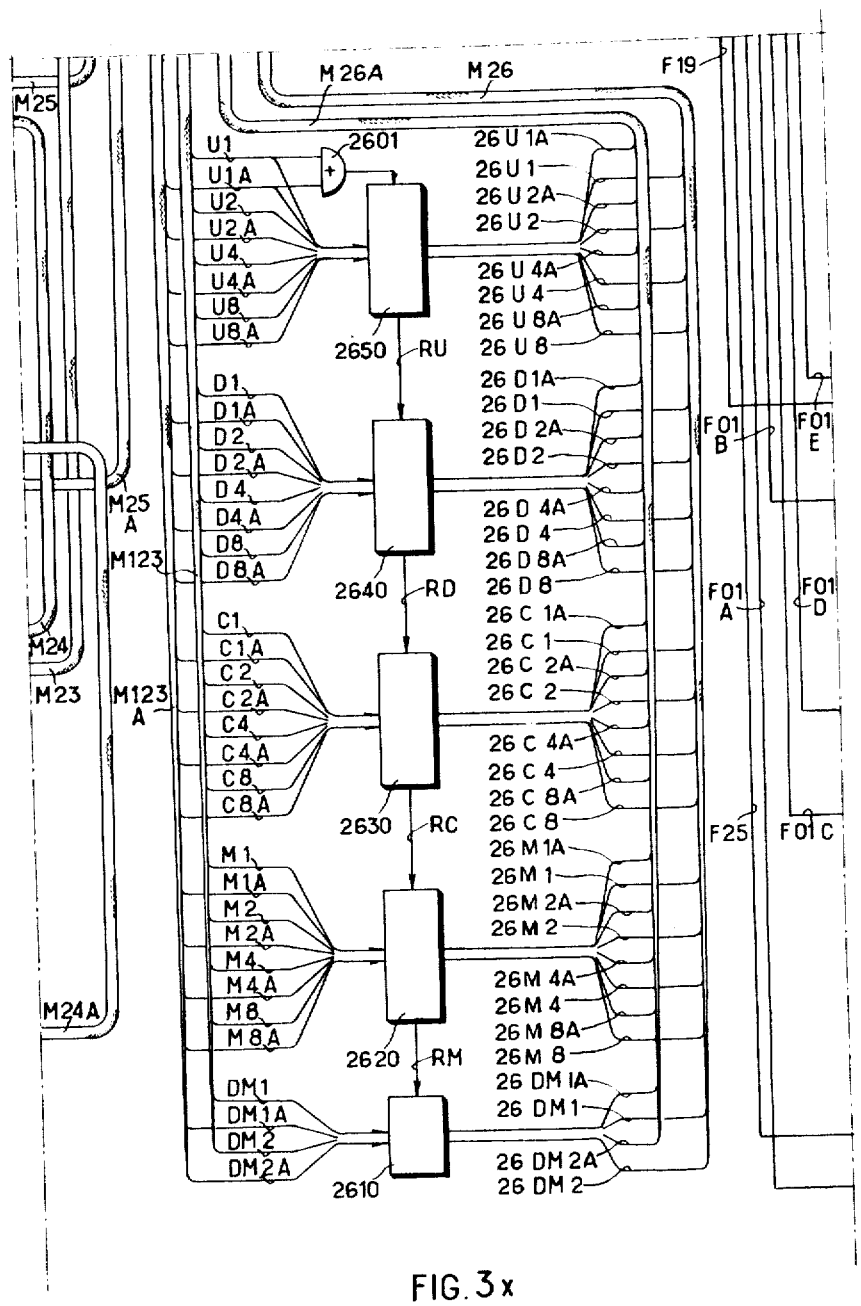
Figure 3Y:
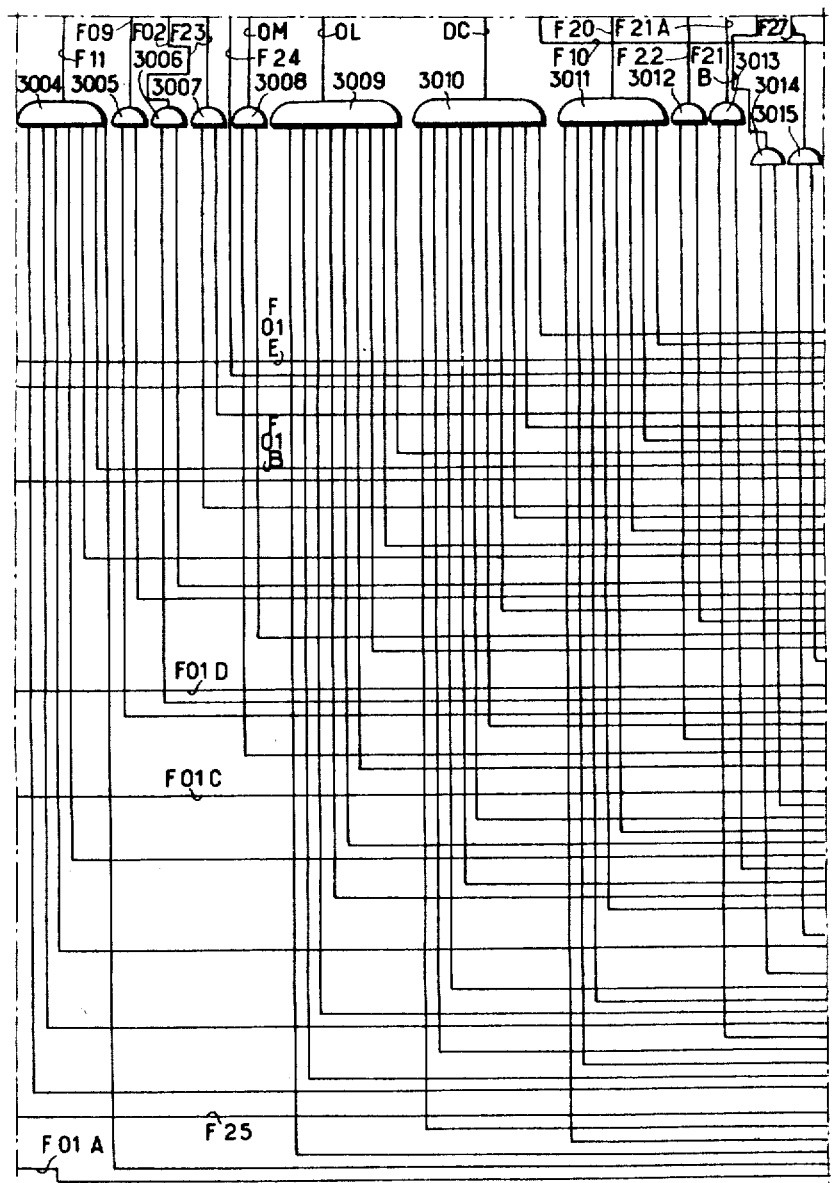
Figure 3Z:
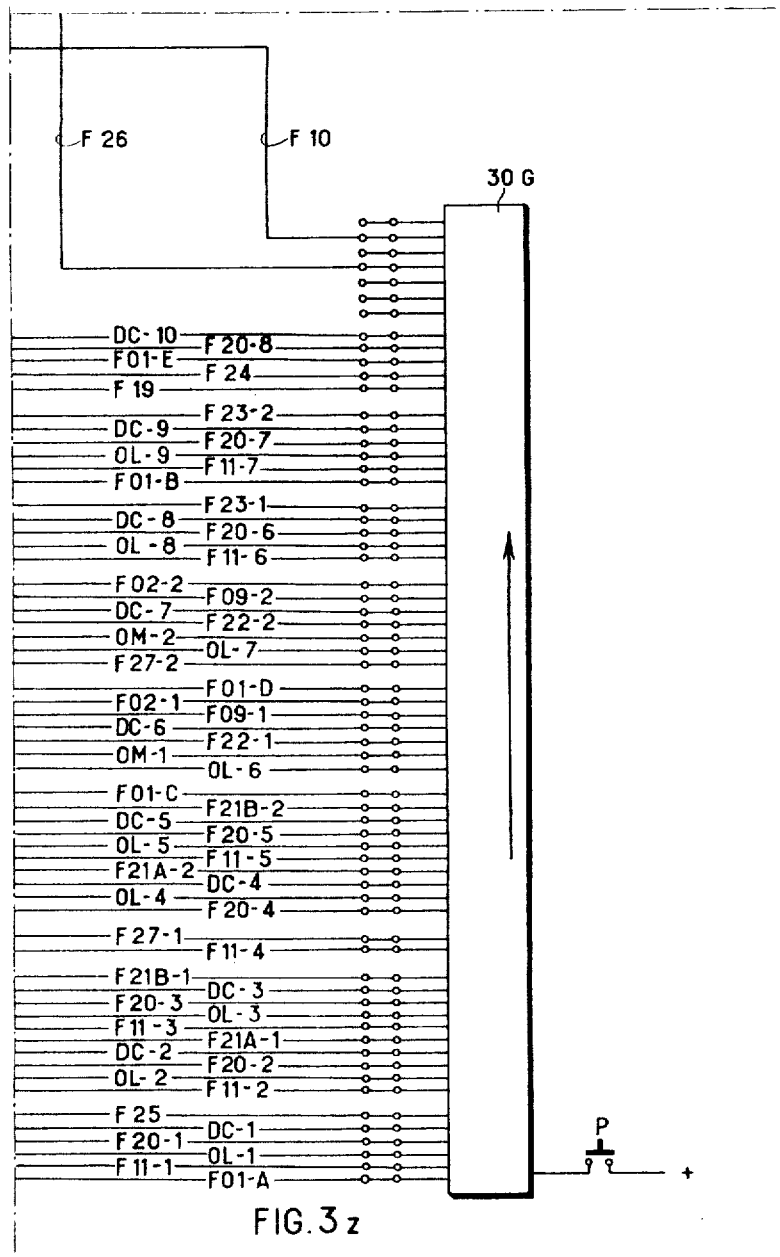

The order register 19, which is shown in FIGURE 3n, consists more especially of two flip-flops 19B1 and 19B2, of which the function is to change to the state 1 when they receive, respectively, the first a "reading" order, coming from the general order generator 30 through a conductor OL, and the second a "word" order coming from the said generator 30 through a conductor OM, which generator 30 is in addition illustrated in FIGURE 3z. A positive voltage is set up at the output of an AND circuit 19LK when only the flip-flop 19B1 is in the state 1. A positive voltage is set up at the output of an AND circuit 19EM when only the flip-flop 19B2 is in the state 1. A positive voltage is set up at the output of an AND circuit 19LM when the two flip-flops 19B1 and 19B2 are both in the state 1, while when these flip-flops are both in the state 0 a positive voltage is set up at the output of an AND circuit 19EK. The two flip-flops 19B1 and 19B2 can be returned to zero by means of an order FC coming from the order generator 15.

*Selection indicator*

It comprises more specially five OR circuits 2005, 2016, 2027, 2038 and 2049 disposed, as shown in FIGURE 3h, at the output of the AND circuits 1410 to 1419 of the decoding member 14. A positive voltage is set up only at the output of the OR circuit 2005 each time the units digit of the address is 0 or 5, this digit being stored, in encoded binary form, in the four flip-flops 14U8, 14U4, 14U2 and 14U1 of the register RAM. A positive voltage is set up only at the output of the OR circuit 2016 when this digit is 1 or 6. If this digit is 2 or 7, this positive voltage is set up only at the output of the OR circuit 2027. If this digit is 3 or 8, this voltage is set up at the output of the OR circuit 2038. Finally, if this digit is 4 or 9, this voltage is set up only at the output of the OR circuit 2049. A series of five flip-flops 20B1 to 20B5 illustrated in FIGURE 3g is provided to effect the selection of the characters which undergo transfers, between the rapid store 11 and the register 16, or between the register 16 and the register 18, or between the register 18 and the register 16, or finally between the register 17 and the register 16. For this purpose, the said flip-flops are positioned either individually, or altogether, in the state 0 or in the state 1, depending upon whether a character or a group of characters is to be introduced into the store 11 or whether a character or a group of characters is to be extracted from this store. The positioning of the flip-flops is effected by means of a return-to-zero pulse FCZ, or by means of pulses supplied either by coincidence circuits 20LK1 to 20LK5, illustrated in FIGURE 3h, which transmit a pulse if it is desired to extract a character, or by means of coincidence circuits 20EK1 to 20EK5, which transmit a pulse if it is desired to introduce a character into the store. The pulses supplied to the circuits 20LK1 to 20LK5, 20EK1 to 20EK5 emanate from two coincidence circuits 20LK and 20EK, respectively, these two circuits being connected respectively, as shown in the assembled FIGURES 3h and 3n, to the AND circuits 19LK and 19EK of the order register 19. Since the coincidence circuits can generally transmit a pulse through the input marked by a dot only when the other input is at a positive voltage, it is apparent that when the order generator 15 sends a pulse F12 to the circuits 20LK and 20EK, this pulse will be transmitted by only one of these two circuits, or will be blocked by them. In the case of the introduction of a group of five characters into the store, the return-to-zero pulse FCZ will position the five flip-flops in the state 0. Each of the OR circuits 2005, 2016, 2027, 2038 and 2049 is connected respectively, on the one hand to one of the five coincidence circuits 20LK1 to 20LK5, and on the other hand through five inverters 2005A, 2016A, 2027A, 2038A and 2049A to one of the five cincidence circuits 20EK1 to 20EK5. Owing to the fact that only one of these OR circuits has its output brought to a positive potential, only one of the five circuits 20LK1 to 20LK5 and only four of the five circuits 20EK1 to 20EK5 have their inputs brought to a positive potential, so that in the case of the extraction of a character from the store the circuit 20LK will transmit a pulse which will thereafter position one of the five flip-flops at 1. For example, if an address ending with 7 is in the register RAM, only the OR circuit 2027 has its output brought to a positive potential, and only the pulse supplied by the circuit 20LK is transmitted through the circuit 20LK3 and positions only the flip-flop 20B3 at 1. Finally, in the case of the introduction of a character into the store, only the circuit 20EK will transmit a pulse, which will similarly position four of the five flip-flops at 1. When the flip-flops 20B1 to 20B5 are in the state 1, their respective "normal" outputs 2010, 2020, 2030, 2040 and 2050 are brought to a positive potential and their respective "complementary" outputs 2010A, 2020A, 2030A, 2040A and 2050A are brought to a negative voltage. When the said flip-flops are in the state 0, the voltages of the outputs are reversed. As may be seen from FIGURE 3g, the five "normal" outputs are connected respectively to the inputs of five OR circuits 201, 202, 203, 204 and 205, while the five "complementary" outputs are connected respectively to the inputs of five groups of coincidence circuits 46E11 to 46E16, 46E21 to 46E26, 46E31 to 46E36, 46E41 to 46E46, and 46E51 to 46E56, each of these groups forming part of the member 46E, and each group having the object of authorising or prohibiting, depending upon the state of the flip-flop to which it is connected, the transfer of one of the characters emanating, in pulse form, either from the transmitting member 36 or from the transmitting member 37, for the purpose of being stored in the register 16.

On the other hand, a conductor 19L connected to the "normal" output of the flip-flop 19B1 leads to the input of the five OR circuits 201 to 205. This conductor 19L is brought to a positive potential each time the flip-flop 19B1 is in the state 1, i.e., each time it is desired to extract a character or a group of characters from the store. The outputs of the OR circuits 201 to 205 are connected respectively to the inputs of five groups of coincidence circuits 46L11 to 46L16, 46L21 to 46L26, 46L31 to 46L36, 56L41 to 46L46, and 46L51 to 46L56, each of these groups being a component part of the member 46L, and each group having the function of authorising or prohibiting, depending upon the state of the output of the OR circuit to which it is connected, the transfer of one of the five characters emanating in pulse form from the member 31.

In the case of the extraction of a character from the store, the conductor 19L is at a positive voltage, so that the outputs of the OR circuits 201 to 205 are all at a positive potential. In this case, the five characters present in the same store column as the desired character are extracted from the store and transmitted by the members 31 and 46L. These five characters will be stored in the register 16, and then transferred to the member 35. In order that only the desired character may be allowed to pass and the other four may be blocked, five AND circuits 2010, 2020, 2030, 2040 and 2050, illustrated in FIGURE 3m, are so arranged that one of their two inputs is connected respectively to the "complementary" outputs of the flip-flops 20B1 to 20B5. Connected to the other input of the said AND circuits is a conductor M10LK which is brought to a positive potential each time it is desired to extract a character from the store in order to introduce it into the register 18.

*Main registers of the machine*

Each of the characters (letters, digits or various signs) is introduced into the store in accordance with a code having six binary positions. The code adopted is a mixed code formed by the association of the binary code 1–2–4–8 and of two additional positions 16 and 32. By way of example, decimal digits, alphabetical letters and certain signs will be encoded in the following manner:

TABLE I

| Characters | Encoded representation in accordance with the positions | | | | | | Characters | Encoded representation in accordance with the positions | | | | | |
|---|---|---|---|---|---|---|---|---|---|---|---|---|---|
| | 32 | 16 | 8 | 4 | 2 | 1 | | 32 | 16 | 8 | 4 | 2 | 1 |
| (space) | 0 | 0 | 0 | 0 | 0 | 0 | 0 (zero) | 1 | 0 | 0 | 0 | 0 | 0 |
| A | 0 | 0 | 0 | 0 | 0 | 1 | 1 | 1 | 0 | 0 | 0 | 0 | 1 |
| B | 0 | 0 | 0 | 0 | 1 | 0 | 2 | 1 | 0 | 0 | 0 | 1 | 0 |
| C | 0 | 0 | 0 | 0 | 1 | 1 | 3 | 1 | 0 | 0 | 0 | 1 | 1 |
| D | 0 | 0 | 0 | 1 | 0 | 0 | 4 | 1 | 0 | 0 | 1 | 0 | 0 |
| E | 0 | 0 | 0 | 1 | 0 | 1 | 5 | 1 | 0 | 0 | 1 | 0 | 1 |
| F | 0 | 0 | 0 | 1 | 1 | 0 | 6 | 1 | 0 | 0 | 1 | 1 | 0 |
| G | 0 | 0 | 0 | 1 | 1 | 1 | 7 | 1 | 0 | 0 | 1 | 1 | 1 |
| H | 0 | 0 | 1 | 0 | 0 | 0 | 8 | 1 | 0 | 1 | 0 | 0 | 0 |
| I | 0 | 0 | 1 | 0 | 0 | 1 | 9 | 1 | 0 | 1 | 0 | 0 | 1 |
| P | 0 | 1 | 0 | 0 | 0 | 0 | A | 1 | 1 | 0 | 0 | 0 | 0 |
| Q | 0 | 1 | 0 | 0 | 0 | 1 | : | 1 | 1 | 0 | 0 | 0 | 1 |
| R | 0 | 1 | 0 | 0 | 1 | 0 | J | 1 | 1 | 0 | 0 | 1 | 0 |
| S | 0 | 1 | 0 | 0 | 1 | 1 | K | 1 | 1 | 0 | 0 | 1 | 1 |
| T | 0 | 1 | 0 | 1 | 0 | 0 | L | 1 | 1 | 0 | 1 | 0 | 0 |
| U | 0 | 1 | 0 | 1 | 0 | 1 | M | 1 | 1 | 0 | 1 | 0 | 1 |
| V | 0 | 1 | 0 | 1 | 1 | 0 | N | 1 | 1 | 0 | 1 | 1 | 0 |
| W | 0 | 1 | 0 | 1 | 1 | 1 | O | 1 | 1 | 0 | 1 | 1 | 1 |
| X | 0 | 1 | 1 | 0 | 0 | 0 | Z | 1 | 1 | 1 | 0 | 0 | 0 |
| Y | 0 | 1 | 1 | 0 | 0 | 1 | . | 1 | 1 | 1 | 0 | 0 | 1 |

With the code thus adopted, which is not the only one that can be employed in accordance with the invention and constitutes only an example, the encoded combination of the decimal digits always comprises the binary digit 1 in the position 32 and the digit 0 in the position 16, these two digits being followed by the encoded binary combination 8–4–2–1 of the decimal digit. For the other characters (letters and various signs), the encoding utilises all the other combinations. The foregoing table gives only the encoding of a few signs, although in fact the remaining combinations serve to encode other signs such as +, −, >, % . . . .

For example, the sign + will be encoded in accordance with the combination 1 1 1 0 1 1, and the sign = will be encoded in accordance with the combination 1 0 1 1 0 1. The first digit of a combination corresponds to the position 32, the second corresponds to the position 16, the third corresponds to the position 8. . . .

The five characters extracted from the store in the course of a cycle require, in order that they may be introduced into the registers, thirty flip-flops, i.e., six flip-flops per character, each flip-flop being capable of introducing only one binary digit of the encoded combination of a character.

The register 16, which is illustrated in FIGURE 3f, consists of five groups of flip-flops 16B11 to 16B16, 16B21 to 16B26, 16B31 to 16B36, 16B41 to 16B46, and 16B51 to 16B56, each group of flip-flops being capable of storing one character, and each of the flip-flops of a group being capable of storing the digits of the positions 1 2 4 8 16 and 32, respectively. For example, the flip-flops 16B21 to 16B26 store, respectively, the binary digits of the positions 1 2 4 8 16 32 of the encoded combination of the second character. With the obvious objects of simplification, there have only been shown in FIGURE 3f the two groups of flip-flops 16B11 to 16B16 and 16B51 to 16B56 which have the objects of storing, respectively, the first and fifth characters, although in fact the register 16 consists of 30 flip-flops. For the sake of the clarity of the figure and in order to simplify the connections, the flip-flops have been shown in a recumbent position in FIGURE 3f, their inputs being situated on the side of the upper edge of the rectangles symbolically representing the said flip-flops, and their outputs situated on the other side. The "normal" inputs and the "normal" outputs are situated in the righthand half of these rectangles. An order F12 coming from the generator 15 permits the return to zero of the 30 flip-flops of the register 16.

The register 18, which is shown in FIGURE 3m, consists of six flip-flops 18B1 to 18B6 which are capable of registering, respectively, the binary digits of the positions 1 2 4 8 16 32 of the encoded combination of a character. These flip-flops can be returned to zero by means of an order F12LK previously sent by the generator 15 if a character extracted from the store is to be introduced into the register 18.

The register 17, which is illustrated in FIGURE 3e, consists, in the same way as the register 16, of thirty flip-flops 17B11 to 17B16, 17B21 to 17B26, 17B31 to 17B36, 17B41 to 17B46, and 17B51 to 17B56 and can thus store five characters. For obvious reasons of simplification, there have only been shown in FIGURE 3e the flip-flops 17B11 to 17B16 and 17B51 to 17B56 serving to store, respectively, the first and fifth of the said characters. The flip-flops of the register 17 may be returned to zero by means of an order F02 coming from the general order generator 30, the said generator being illustrated in FIGURE 3z. Thirty coincidence circuits 3311, 3312, 3313 . . . 3354, 3355 and 3356, of which only twelve have been illustrated in FIGURE 3f, constitute the transmitting member 33 and have the object of transmitting in the form of pulses, when they receive an order pulse F16 combing from the generator 15, the encoded combinations of the characters contained in the register 16. The characters thus trransmitted are sent to the members 34 and 35. The member 34 consists of thirty coincidence circuits 3411, 3412, 3413 . . . 3454, 3455 and 3456, of which only twelve are shown in FIGURE 3l. These circuits allow the passage of the pulses coming from the member 33 and representing the encoded combinations of the characters only when the conductor M10LM is brought to a positive potential, that is to say, when a group of five characters previously extracted from the store and then introduced into the register 16 is thereafter to be introduced into the register 17. The member 35 consists of five groups of coincidence circuits 3511 to 3516, 3521 to 3526, 3531 to 3536, 3541 to 3546, and 3551 to 3556, of which only two groups are shown in FIGURE 3k. Each of these groups is connected respectively to the outputs of the AND circuits 2010, 2020, 2030, 2040 and 2050. If one of the five characters extracted from the store and introduced into the register 16 is to be introduced into the register 18, only one of the said AND circuits has its output brought to a positive potential, so that only one of the said five groups of coincidence circuits allows the passage of the pulses emanating from the member 33 and representing the encoded combinations of the characters. Finally, one of the groups of coincidence circuits allows the passage of the pulses representing the encoded combination of a character, while the other four groups block the pulses representing the encoded combinations of the other four characters. Six coincidence circuits 3601 to 3606, which are illustrated in FIGURE 3m, constitute the member 36. If a character contained in the register 18 is to be introduced into the store, these six coincidence circuits are set in operation by means of an order pulse F15EK coming from the generator 15, and then bringing about the transfer of the character contained in the register 18 to the register 16, the said character being transferred in the form of pulses which, after passing through the member 46E, reach the flip-flops of the register 16.

Thirty coincidence circuits 3716, 3715, 3714 . . . 3754, 3753, 3752 and 3751, twelve of which are shown in FIGURE 3s, constitute the member 37. If a group of five characters contained in the register 17 is to be introduced into the store, these thirty coincidence circuits are set in operation by means of an order pulse F15EM coming from the generator 15, and then bring about the transfer, in the form of pulses, of these five characters from the register 17 to the register 16. The said pulses pass through the coincidence circuits constituting the member 46E.

The register 23, which is illustrated in FIGURES 3q and 3r, is intended to contain a developed address of five characters which has been extracted from the store, the said developed address being comprised between 00000 and 39999. Since the characters contained in this register can only be decimal digits, the binary digits of the positions 16 and 32 of a combination have no use, since the binary digits of the positions 8–4–2–1 are sufficient to differentiate the encoded combinations of the decimal digits. Consequently, the register 23 will consist of eighteen flip-flops.

The ten thousands digit of the developed address is registered in two flip-flops 23DM2 and 23DM1, the thousands digit is registered in four flip-flops 23M8, 23M4, 23M2 and 23M1, the hundreds digit is registered in four flip-flops 23C8, 23C4, 23C2 and 23C1, the tens digit is stored in four flip-flops 23D8, 23D4, 23D2 and 23D1, and finally the units digit is registered in four flip-flops 23U8, 23U4, 23U2 and 23U1. On comparison with the flip-flops of the register 17 of FIGURE 3e, the "normal" outputs of the flip-flops 17B12, 17B11, 17B24 to 17B21, 17B34 to 17B31, 17B44 to 17B41, and 17B54 to 17B51 will be found to correspond to the respective "normal" inputs of the flip-flops 23DM2, 23DM1, 23M8 to 23M1, 23C8 to 23C1, 23D8 to 23D1, and 23U8 to 23U1. It will further be noted that since each of the flip-flops of the register 23 always receives a pulse through either one of its inputs during the transfers, it is unnecessary to effect a return to zero of the flip-flops of the said register before a new developed address is stored therein, since any new developed address arriving in the register 23 is registered therein and "erases" the old one. The transfer of a developed address from the register 17 into the register 23 is effected by means of a first group of coincidence circuits denoted by 3812, 3811, 3828 . . . 3854, 3852 and 3851, which control the pulses arriving at the "normal" inputs of the flip-flops of the register 23, and by means of a second group of coincidence circuits denoted by 3812A, 3811A, 3828A . . . 3854A, 3852A, and 3851A controlling the pulses arriving at the "complementary" inputs of the flip-flops of the register 23. These two groups of coincidence circuits constitute the transmitting member 38 of FIGURE 1 and receive a pulse F09 which thus orders the transfer of the developed address contained in the register 17 into the register 23.

The registers 24 and 25, which are illustrated in the assembled FIGURES 3v and 3w, are intended to contain a developed address comprised between 00000 and 39999. The said registers, which are of exactly the same form as the register 23, therefore each comprise eighteen flip-flops, the register 24 comprising the flip-flops designated 24DM2, 24DM1, 24M8 . . . 24U4, 24U2 and 24U1, and the register 25 comprising the flip-flops designated 25DM2, 25DM1, 25M8 . . . 25U4, 25U2 and 25U1, the references indicated having obvious significanes. A first group of coincidence circuits 5012, 5011, 5028 . . . 5054, 5052 and 5051, and a second group of these circuit 5012A, 5011A, 5028A . . . 5054A, 5052A and 5051A permit the transfer of the developed address contained in the register 23 into the register 24, these coincidence circuits constituting the transmitting member 50 and receiving an order pulse F01 coming from the generator 30. In exactly the same way, two other groups of coincidence circuits 5112, 5111, 5128 . . . 5154, 5152, 5151, and 5112A, 5111A, 5128A . . . 5154A, 5152A and 5151A constitutes the transmitting member 51 and permit, as a result of the order pulse F01 coming from the generator 30, the transfer of the developed address contained in the register 24 into the register 25. Finally, two other groups of coincidence circuits shown in FIGURES 3q and 3r, 5212, 5211, 5228 . . . 5254, 5252, 5251 and 5212A, 5211A, 5228A . . . 5254A, 5252A, 5251A constitute the transmitting member 52 and permit, as a result of the order pulse F01, the transfer of the developed address contained in the register 25 into the register 23.

In FIGURE 3j there will be seen coincidence circuits 3912, 3911, 3924, 3923, 3922, 3921 . . . 3954, 3953, 3952, 3951, only some of which have been shown. These circuits form part of the transmitting member 39 and permit, as a result of the order pulse F10 coming from the generator 30, of transferring a developed address contained in the register 23 into the register 17. Since each character is entered in the register 17 in accordance with a six-position code, while it is entered in the register 23 in accordance with the code 8–4–2–1, it is desirable that, during any transfer from the register 23 to the register 17, an additional binary digit should be added at the position 32 to the combination 8–4–2–1 of each character. This addition is effected, for example, by means of additional coincidence circuits, 3916, 3926, 3936, 3946 and 3956 which, on receiving the order pulse F10, cause the flip-flops 17B16, 17B26, 17B36, 17B46 and 17B56 to change to the state 1.

*Address-modifying member*

In order that the developed address contained in the register 23 may be rapidly modified by an increase by 1, for example, the address-modifying member 26 may consist, for example, of a set of half-adders disposed as indicated in FIGURE 3x. This figure shows five half-adders 2650, 2640, 2630, 2620 and 2610, each half-adder being formed, in accordance with a well-known form of construction, of AND circuits and OR circuits appropriately arranged and effecting the "parallel" addition of two encoded binary decimal digits. These half-adders will not be described in detail, since they do not form part of the invention. Each of them receives through conductors U1, U2, U4 . . . DM1, DM2 the encoded binary combination of a decimal digit. These conductors extend from the "normal" outputs of the corresponding flip-flops of the register 23. Since it is often necessary to use inverters in the circuits of half-adders, it is more desirable to use values represented by the state of the "complementary" outputs of the said flip-flops. For this purpose, the "complementary" outputs of the flip-flops of the register 23 are connected to the inputs of the half-adders by conductors U1A, U2A, U4A . . . DM1A, DM2A, as shown in FIGURES 3q, 3r and 3x. The two conductors U1 and U1A lead to the two inputs of an OR circuit 2601 and, owing to the fact that either one of these two conductors is always at a positive voltage, this OR circuit 2601 always supplies at its output a positive voltage representing the digit 1 to be added to the developed address. The half-adder 2650, which receives the said value 1 to be added and the units digit of the developed address, performs the operation of adding these two digits. The result emerges in coded form in accordance with 8–4–2–1, at the conductors 26U8, 26U4, 26U2 and 26U1. If the digit entering the half-adder 2650 is 9, the result emerging is 0000, while a carry RU is transmitted to the half-adder 2640. The latter performs the operation of adding the carry RU (if it exists) with the tens digit of the developed address arriving through the conductors D1 to D8A. The result obtained emerges along the conductors 26D1 to 26D8A, while any carry RD is transmitted to the half-adder 2630. The half-adder 2630 performs the addition of the carry RD (if it exists) with the hundreds digit of the developed address. The result emerges along the conductors 26C1 to 26C8A, while any carry RC is transmitted to the half-adder 2620. The latter performs the addition of the carry RC (if it exists) with the thousand digit of the developed address. The result emerges along the conductors 26M1 to 26M8A, while any carry RM is transmitted to the half-adder 2610. The latter finally performs the addition of the carry RM (if it exists) with the ten-thousands digit of the developed address. The result emerges along the conductors 26DM1 to 26DM2A.

Each time one of the half-adders 2650, 2640, 2630 and 2620 performs the sum 9+1, it gives as the result 0 and transmits a carry to the half-adder which performs the operation on the decimal digit of higher order.

When a carry RM is transmitted to the half-adder 2610 and the latter is caused to perform the addition 3+1, the result obtained is 0. Thus, in cases where the initial developed address is 3 9 9 9 9, the half-adder 2650 performs the addition 9+1 and gives as its result 0, while a carry RU is transmitted to the half-adder 2640. As a result of the successive additions, each of the half-adders 2640, 2630 and 2620 gives 0 as the result, while a carry is transmitted to the succeeding half-adder in each instance. The half-adder 2610 then performs the addition 3+1 and gives as the result 0, so that the developed address modified by all the half-adders finally becomes 00000.

Of course, the device described here constitutes only an example and may be replaced by any other rapidly operating address-modifying member. In the device described here, the developed address increased by 1 is made to correspond to any developed address contained in the register 23 by means of the address-modifying member, as a result of the state of the conductors 26U1, 26U1A, 26U2, 26U2A . . . 26DM2, 26DM2A. This modified developed address may then be transferred into the register 23 by means of a first group of coincidence circuits 4912, 4011, 4928 . . . 4952, 4951, and by means of a second group of coincidence circuits 4912A, 4911A, 4928A . . . 4952A, 4951A, these two groups constituting the transmitting member 49 and receiving an order pulse F11 coming from the generator 30. The coincidence circuits thus mentioned are illustrated in FIGURES 3q and 3r. Each time a pulse F11 is sent to the member 49, the developed address contained in the register 23 is therefore increased by 1.

*Instruction decoder and adder-subtractor*

The instruction decoder 21 and the adder-subtractor 22, which are illustrated in FIGURE 3s, will not be described in detail, because they do not form part of the invention. Coincidence circuits 4101 to 4106 forming part of the member 41 make it possible, under the action of an order pulse F25, to transfer the character T.O. of the instruction from the register 18 to the instruction decoder, in which it is stored and decoded. It will here be assumed that the character T.O. transmitted to the instruction decoder 21 is either the sign + or the sign −. As a function of the decoding effected the instruction decoder will send to the adder-subtractor either a pulse F30A ordering an addition if the character T.O. which has been transmitted to it is the sign +, or a pulse F30S ordering a subtraction if the character T.O. which has been transmitted to it is the sign −. The pulse F30A, or the pulse F30S, however, is not sent to the adder-subtractor until the instant when the decoder 21 receives an order pulse F19 coming from the generator 30.

The "normal" outputs of the flip-flops 18B1 to 18B4 are connected to the inputs of coincidence circuits 4001 to 4004, respectively, while the "complementary" outputs of the said flip-flops are connected to the inputs of coincidence circuits 4001A to 4004A respectively. These coincidence circuits constitute the member 40 and effect, when they receive an order pulse F23, the transfer of an encoded decimal digit from the register 18 to the adder-subtractor. The two decimal digits to be added or subtracted are thus transferred one after the other to the adder-subtractor. After reception either of the pulse F30A or of the pulse F30S, the two decimal digits are either added or subtracted, and the encoded result is transmitted to the register 18 by means of coincidence circuits 4201 to 4204, which are shown in FIGURE 3k, and coincidence circuits 4201A to 4204A, which are shown in FIGURE 3m. Two additional coincidence circuits 4206 and 4205A serve to position the flip-flop 18B6 at 1 and the flip-flop 18B5 at 0, respectively, so that the result coming from the adder-subtractor is represented in the register 18 in accordance with a six-position code. All the coincidence circuits 4201 to 4204, 4201A to 4204A, 4206 and 4205A constitute the member 42 and position the flip-flops of the register 18 as soon as they have received an order pulse F24 coming from the generator 30. A pulse F26 coming from the generator 30 and performing an inhibitory rôle has the object of erasing the character T.O. present in the decoder 21, i.e., of retuning to zero the circuits for the storage of the said character within the said decoder.

Index registers

The registers 27 and 28 represented by FIGURES 3p and 3u assembled, consists of flip-flops 27B11, 27B12 . . . 27B25, 27B26 in the case of the register 27, and of flip-flops 28B11, 28B12 . . . 28B25, 28B26 in the case of the register 28. The flip-flops 27B11 to 27B16, or 28B11 to 28B16 can store the first character forming part of an index. For example, if the index is formed of the two characters G3, these flip-flops can store the character G. The flip-flops 27B21 to 27B26, or 28B21 to 28B26 can store the second character forming part of the said index. The characters of an index, after extraction from the store 11, are successively temporarily stored in the register 18 and are then successively transferred into the register 27 by means of coincidence circuits 4311 to 4316, 4311A to 4316A, receiving an order pulse F21A coming from the generator 30, or by means of coincidence circuits 4321 to 4326, 4321A to 4326A, receiving an order pulse F21B coming from the generator 30. Since the flip-flops of these registers always receive a pulse at either one of their inputs during the transfers, the return to zero of the said flip-flops is not essential. The registers 27 and 28 can exchange their contents by means of a pulse F27 coming from the generator 30 and acting on coincidence circuits 4511 to 4516, 4511A to 4516A, 4521 to 4526, 4521A to 4526A, 4411 to 4416, 4411A to 4416A, 4421 to 4426 and 4421A to 4426A.

Encoder

The Encoder 29 has the object of converting into an encoded binary decimal reduced address an index contained in the register 27, the said reduced address being, for example, between 0000 and 7995 and ending with 0, or with 5. If, for example, the index contained in the register 27 is G3, the reduced address corresponding to the transformation of this index by the encoder 29 will be 0670. The encoder 29 will cause the reduced address 4915 to correspond to the index formed of the two characters: T contained in the register 27. By way of example, the indexes used in the present invention consist of two characters taken from the forty characters appearing in Table I, which has been given with reference to the encoding of the characters. As is shown by this table, the characters employed to form the indexes are all the twenty-six letters of the alphabet, all the decimal digits from 0 to 9, three special signs ($\Delta$, : and .) and the space (or absence of characters). Thus, by combining these 40 characters, it is possible to have available 1600 different indexes, each of which consists of two of these characters. Table I further shows that in the encoding of the said characters the combinations 8–4–2–1 are decimals and that consequently the digit 1, in position 8, occurs only two out of ten times on average, while the digit 0, in the same position, is present 8 out of ten times on average. This feature may cause difficulty in the transformation of the index into a reduced address, because the binary digit in the eight position of the second character of the index is utilised to form a binary encoded combination of the thousands digit of the reduced address. In this way, it may happen that two different indexes may be converted into an identical reduced address. In order to obviate this disadvantage, the second character of the index is modified, before the transformation into a reduced address, so as to change from the code 32 16 8 4 2 1 into a code in which the binary digit which was initially in the 8 position is present one out of two times on average, for example into the code 32 16 5 4 2 1. The encoded combinations of the characters will then be those shown in the following table:

TABLE II

| Characters | Representation encoded in accordance with the positions | | | | | | Characters | Representation encoded in accordance with the positions | | | | | |
|---|---|---|---|---|---|---|---|---|---|---|---|---|---|
| | $32_m$ | $16_m$ | $5_m$ | $4_m$ | $2_m$ | $1_m$ | | $32_m$ | $16_m$ | $5_m$ | $4_m$ | $2_m$ | $1_m$ |
| (space) | 0 | 0 | 0 | 0 | 0 | 0 | 0 (zero) | 1 | 0 | 0 | 0 | 0 | 0 |
| A | 0 | 0 | 0 | 0 | 0 | 1 | 1 | 1 | 0 | 0 | 0 | 0 | 1 |
| B | 0 | 0 | 0 | 0 | 1 | 0 | 2 | 1 | 0 | 0 | 0 | 1 | 0 |
| C | 0 | 0 | 0 | 0 | 1 | 1 | 3 | 1 | 0 | 0 | 0 | 1 | 1 |
| D | 0 | 0 | 0 | 1 | 0 | 0 | 4 | 1 | 0 | 0 | 1 | 0 | 0 |
| E | 0 | 0 | 1 | 0 | 0 | 0 | 5 | 1 | 0 | 1 | 0 | 0 | 0 |
| F | 0 | 0 | 1 | 0 | 0 | 1 | 6 | 1 | 0 | 1 | 0 | 0 | 1 |
| G | 0 | 0 | 1 | 0 | 1 | 0 | 7 | 1 | 0 | 1 | 0 | 1 | 0 |
| H | 0 | 0 | 1 | 0 | 1 | 1 | 8 | 1 | 0 | 1 | 0 | 1 | 1 |
| I | 0 | 0 | 1 | 1 | 0 | 0 | 9 | 1 | 0 | 1 | 1 | 0 | 0 |
| P | 0 | 1 | 0 | 0 | 0 | 0 | $\Delta$ | 1 | 1 | 0 | 0 | 0 | 0 |
| Q | 0 | 1 | 0 | 0 | 0 | 1 | : | 1 | 1 | 0 | 0 | 0 | 1 |
| R | 0 | 1 | 0 | 0 | 1 | 0 | J | 1 | 1 | 0 | 0 | 1 | 0 |
| S | 0 | 1 | 0 | 0 | 1 | 1 | K | 1 | 1 | 0 | 0 | 1 | 1 |
| T | 0 | 1 | 0 | 1 | 0 | 0 | L | 1 | 1 | 0 | 1 | 0 | 0 |
| U | 0 | 1 | 1 | 0 | 0 | 0 | M | 1 | 1 | 1 | 0 | 0 | 0 |
| V | 0 | 1 | 1 | 0 | 0 | 1 | N | 1 | 1 | 1 | 0 | 0 | 1 |
| W | 0 | 1 | 1 | 0 | 1 | 0 | O | 1 | 1 | 1 | 0 | 1 | 0 |
| X | 0 | 1 | 1 | 0 | 1 | 1 | Z | 1 | 1 | 0 | 1 | 1 | 1 |
| Y | 0 | 1 | 1 | 1 | 0 | 0 | . | 1 | 1 | 1 | 1 | 0 | 0 |

The mark m indicates that the positions relate to the code 32 16 5 4 2 1.

The logical equations of this modification are the following:

$$1_m = \bar{1}(8 + 4.2) + 1.\bar{8}.\bar{4}.$$
$$2_m = 2(\bar{4}.\bar{8} + 1.8 + 1.4) + \bar{2}.\bar{1}.8$$
$$4_m = \bar{1}.\bar{2}.4.\bar{8} + 1.8$$
$$5_m = 4(1+2) + 8$$
$$16_m = 16$$
$$32_m = 32$$

This modification is effected by a set of AND circuits and of OR circuits designated 2910 to 2924 and illustrated in FIGURE 3d. These circuits constitute the encoder 29. The reduced address supplied by the transformation of the index contained in the register 27 is obtained by first taking the binary digit in the 16 position of the first index character and sending it into the flip-flops 14U1 and 14U4 of the register RAM, so that the combination stored in the flip-flops 14U1, 14U2, 14U4 and 14U8 represents either the decimal digit 0 or the digit 5 constituting the units digit of the reduced address. The binary digits in the position 1–2–4–8 of the first character of the index are sent into the flip-flops 14D1, 14D2, 14D4 and 14D8, respectively, of the register RAM, so as to form the tens digit of the reduced address. The binary digit in the 32 position of the first character of the index is sent into the flip-flop 14C1 of the register RAM. After modification into the code $32_m$ $16_m$ $5_m$ $4_m$ $2_m$ $1_m$ of the second character of the index contained in the register 27, the binary digits in the position $1_m$ $2_m$ $4_m$ are sent into the flip-flops 14C2, 14C4 and 14C8 respectively of the register RAM, so as to constitute with the binary digit registered in the flip-flop 14C1 the hundreds digit of the reduced address.

Finally, the binary digits in the position $5_m$ $16_m$ $32_m$ are sent into the flip-flops 14M1, 14M4 and 14M2 of the register RAM, so as to form the thousands digit of the reduced address. It is obvious that all the flip-flops of the register RAM have been returned to zero before any despatch of binary digits into the said flip-flops. On assembly of FIGURES 3e, 3d, 3h, 3i, 3p and 3u, it will be appreciated that the index contained in the register 27 is converted by the encoder into a reduced address which is sent into the register RAM by means of coincidence circuits 47U1, 47U4, 47D1, 47D2, 47D4 . . . 47M1, 47M2 and 47M4 constituting the transmitting member 47 and receiving an order pulse F22 coming from the generator 30. The said reduced address is comprised between 0000 and 7995 and always ends in the digit 0 or in the digit 5. FIGURES 3d and 3i again show a set of coincidence circuits 48U1, 48U2, 48U4 . . . 48M8, 48DM1, 48DM2 constituting the transmitting member 48. These coincidence circuits are intended to transmit a developed address contained in the register 23 to the register RAM when they receive an order pulse F20 coming from the generator 30, the said developed address being comprised between 00000 and 39999.

*Order generators*

FIGURE 3n shows a rectangle which symbolically represents the auxiliary order generator 15. This generator is intended to produce from a starting pulse D.C. coming from the generator 30 a series of time-staggered pulses, the object of which is to act either on flip-flops or on coincidence circuits for the purpose of coordinating all the operations involved in the extraction of the characters from the store or their introduction into the latter. The generator 15 consists, for example, of a delay line having centre taps, with or without graded regenerators, the said line thus supplying pulses at predetermined instants in accordance with the operations to be performed. In order to avoid reflection of the pulses at the end of the line, this delay line comprises at its end an echo suppressor which suppresses reflections. The pulses supplied by the generator 15 successively leave the generator in the order indicated by the direction of the arrow: F12, LE–1, LE–2, F14 . . . F17, F18. The last pulse is directed in two different directions so that a pulse F C Z for returning to zero the flip-flops 20B1 to 20B5, and a pulse FC which effects the return to zero of the flip-flops 19B1 and 19B2 can be simultaneously sent.

The general order generator 30 comprises, for example, a pulse generator 30G shown in FIGURE 3z, which has the same construction as the generator 15. A push button P connected to a positive pulse source (not shown) symbolically represents, for example, a known method of supplying a single starting pulse from the generator 30G. The said generator thereafter supplies, in the order indicated by the arrow, a series of pulses, some of which go to mixer circuits 3002 to 3015, these circuits being shown in FIGURES 3s and 3y and thus permitting of combining a number of conductors to form a single conductor. The pulse transmitted by the mixer circuit 3002 arrives on the one hand at another mixer circuit 3001 and on the other hand at a delay line 30R which supplies an appreciably delayed pulse to the circuit 3001. It is thereby possible to split any pulse transmitted by the circuit 3002 into two time-staggered pulses F01–2 and F01–3 which will be transmitted by the circuit 3001. The pulses transmitted by the circuits 3003 and 3001 respectively will be called F01–1 and F01.

OPERATION OF THE MACHINE

The operation of the machine just described will now be considered with reference to the working stages which occur in the course of each operation. The description of the operation of the machine will be more readily understood with reference to FIGURES 3a to 3k, 3m, 3n and 3p to 3z but where necessary reference may be had to FIGURE 1 which will enable the path of the data in the course of the various working stages to be more readily followed.

Before any work of extracting an instruction from the store, the flip-flops 19B1 and 19B2 and the registers 17 and RAM are initially at zero and the instruction decoder 21 contains no character. The developed address of the last character of the last instruction employed is present in the register 24, and in order to obtain the developed address of the first character of the succeeding instruction it is desirable to transfer this developed address into the register 23 and to cause it to advance. After starting by means of the push button P, the generator 30G sends a pulse F01A which, after transmission through the circuit 3002, is divided into two pulses F01–2 and F01–3. The pulse F01–2 transmitted through the circuit 3001 in the form of a pulse marked F01 brings about the transfer of the developed address from the register 24 to the register 25. The pulse F01–3, suitably delayed, is transmitted through the circuit 3001 in the form of another pulse F01 which, when the preceding transfer is complete, brings about the transfer of the developed address from the register 25 to the register 23. The delay of the delay line 30R has been predetermined in such manner that this second transfer can take place only from the instant when the first transfer is assumed to be complete. The generator 30G then sends a pulse F11–1, which causes the developed address contained in the register 23 to advance. The new developed address is then that of the first character of the succeeding instruction, i.e., that of a character T.O. In order to give a clear idea, it will be assumed that this developed address is 12386. The generator 30G then sends a pulse OL1 constituting the "reading" order, which is registered in the flip-flop 19B1 of the order register 19. The output of the AND circuit 19LK is then at a positive voltage. A pulse F20–1 sent by the generator 30G brings about the transfer of the developed address from the register 23 to the register RAM of the decoding member 14. After decoding the said developed address effects the positioning of the switches of the half-selectors 12–1, 12–2, 13–1 and 13–2, these switches being those whose reference commences by the letter I, such as LAXB0, LAXB1 . . . . The generator 30G thereafter sends a starting pulse DC–1, which is transmitted to the generator 15. Starting from this pulse, the generator 15 successively sends the pulses F12, LE–1, F14 . . . F18, FC and FCZ. The pulse F12 is sent in three different directions, whereby it is enabled to return the register 16 to zero, on the one hand, and to reach the coincidence circuits 20EM, 20LK, 20EK and 1901, on the other hand. When transmitted through the circuit 1901, it is referenced F12LK and effects the return to zero of the register 18. On arriving at the coincidence circuits 20EM, 20LK and 20EK, it is transmitted only by the circuit 20LK. Since the units digit of the developed address contained in the register RAM is 6 in the example chosen, the output of the AND circuit 2006 is positive, so that the pulse transmitted by the circuit 20LK reaches the coincidence circuits 20LK1 and 20L25, but it is transmitted only by the circuit 20LK2 and positions at 1 the flip-flop 20B2, the other flip-flops 20B1, 20B3, 10B4 and 20B5 remaining at zero. Thereafter, the output conductor 2020 is at a positive voltage. Owing to the fact that the flip-flop 19B1 is at 1, the conductor 19L is at a positive voltage, so that the outputs of the OR circuits 201 to 205 are at a positive voltage and the coincidence circuits of the member 46L are able to transmit all the pulses emanating from the transmitting member 31.

The generator 15 thereafter sends the pulses LE-1 and LE-2, which close the corresponding switches of the half-selectors 12-1, 12-2, 13-1 and 13-2. A store column is then selected and the five characters which it contains are extracted from the store and arrive at the member 31, which, under the action of a pulse F14 arriving from the generator 15, sends the encoded combinations of these five characters to the transmitting member 46L, the said combinations reaching the said member in the form of pulses, so that the presence of a pulse represents the binary digit 1 of a combination, and the absence of pulse represents the binary digit 0. Owing to the fact that the coincidence circuits of the member 46L are capable of then transmitting all the pulses which reach them, the pulses coming from the member 31 and representing the five characters are transmitted by the member 46L and position the flip-flops of the register 16, so that the state of the latter represents the encoded combinations of the said characters. The five characters are thus stored in the register 16, while the cores of the store columns in which they were contained have returned to the state 0. The generator 15 then sends a pulse F16 which, on arriving at the transmitting member 33, validates the transmission, in the form of pulses, of the five characters contained in the register 16 to the transmitting members 34 and 35. Owing to the fact that the conductor M10LM coming from the output of the AND circuit 19LM is not a positive voltage, the member 34 blocks all the pulses which reach it. Owing to the fact that the conductor M10LK coming from the output of the AND circuit 19LK is at a positive voltage and that the output conductor 2020 of the flip-flop is also at a positive voltage, the output of the AND circuit 2062 is at a positive voltage, while those of the AND circuits 2061 and 2063 to 2065 are not at a positive voltage. Only the coincidence circuits 3521 to 3526 authorise the passage of the pulses coming from the member 33 and consequently the character whose developed address is 12386 is transferred in the form of the said pulses into the register 18. The other characters emanating, in the form of pulses, from the member 33 are blocked by the coincidence circuits 3511 to 3516, 3531, 3532 . . . 3555 and 3556. The generator 15 thereafter sends the pulses EC-1 and EC-2, which close the corresponding switches of the half-selectors 12-1, 12-2, 13-1, 13-2. During the time when these switches remain closed, the generator 15 sends a pulse F17, which arrives at the transmitting member 32 and enables the five characters previously extracted from the store to be reintroduced into the latter and into the column in which they were contained before their extraction.

It is to be noted that the state of the flip-flops of the register 16 has not been modified in the course of the restorage of the five characters in the store, so that the register 16 always contains the encoded combinations of the said characters. This remark applies also to the state of the flip-flops of the other registers. The register 16 will therefore subsequently be returned to zero by another pulse F12. A pulse F18 sent by the generator 15 returns to zero the flip-flops of the register RAM. The flip-flops 20B1 to 20B5, 19B1 to 19B2 are also returned to zero under the action of the pulses FC and FCZ sent by the generator 15. At the end of the aforesaid operations, the character contained in the register 18 is the character T.O. of the instruction. This character will be, for example, the sign + and it will be assumed that the instruction which is about to be extracted from the store consists, for example, of the following characters: + N G 9 H. The said instruction thus comprises a character + and two indexes consisting of the characters NG and 9H respectively. An order pulse F25 sent by the generator 30G acts on the transmitting member 41 and thus brings about the transfer of the character T.O. from the register 18 to the instruction decoder 21, into which it is introduced and then decoded. The generator 30G then sends to the member 49 a pulse F11-2, which has the effect of advancing the developed address contained in the register 23. This developed address thus becomes 12387. The generator 30G thereafter sends a pulse 01-2, which positions at 1 the flip-flop 19B1. When sent into the register RAM under the action of a pulse F2C-2 supplied by the generator 30G, the developed address 12387 again effects, after decoding, the positioning of the switches of the half-selectors 12-1, 12-2, 13-1 and 13-2. A pulse DC-2 is thereafter sent by the generator 30G to the generator 15. By the same process as before, which can readily be reconstructed on the basis of FIGURES 3a to 3k, 3m, 3n and 3p to 3z, five characters are extracted from the store and introduced into the register 16. These five characters include the second character of the instruction which is to be extracted, i.e., the character N. By means of a pulse F16 supplied by the generator 15, these five characters arrive at the members 34 and 35. Only the character N is transmitted by the coincidence circuits 3531 to 3536, all the other characters being blocked. The character N thus reaches the register 18 in which it is stored. This character is the first character of the index NG of the instruction. When the generator 15 has sent pulses EC-1, EC-2, F17, F18, FC and FCZ permitting the re-introduction into the store of the characters contained in the register 16, and the return to zero of the registers RAM and of the flip-flops 19B1, 19B2, 20B1 to 20B5, a pulse F21A-1 is sent by the generator 30G in order to transfer into the flip-flops 27B11 to 27B16 the character N situated in the register 18. A further pulse F11-3 permits of advancing the developed address of the register 23, which becomes 12388. Three pulses OL-3, F20-3 and DC-3 sent successively by the generator 30G produce a series of operations similar to those which have just been described, and in the course of which the second character G of the index NG of the instruction is extracted from the store and then finally introduced into the register 18. A pulse F21B-1 sent by the generator 30G permits of transferring this character G from the register 18 to the flip-flops 27B21 to 27B26. At this instant, the register 27 then contains the index NG. The generator 30G then sends a pulse F11-4, which advances the developed address of the register 23, which address becomes 12389. A pulse F03-1 then enables the index NG to be transferred from the register 27 to the register 28. It will then be possible to supply to the register 27 the index 9H of the instruction. This supply is effected by means of pulses F20-4, OL-4, DC-4 and F21A-2, which enable the character 9 to be extracted from the store by the same process as before and finally to be introduced into the flip-flops 27B11 to 27B16 under the action of a pulse F11-5, which enables the developed address to advance, which address becomes 12390, and finally under the action of the pulses OL-5, F20-5, DC-5 and F21B-2, which enable the character H to be extracted from the store and to be finally introduced into the flip-flops 27B21 to 27B26. At this instant, all the characters of the instruction have been extracted from the store, the instruction decoder containing the character +, the register 28 containing the index NG, and the register 27 containing the index 9H. The developed address 12390 contained in the register 23 is the address of the last character of this instruction and a pulse F01–C enables this developed address, which is not not utilised, to be transferred into the register 24. The generator 30G then sends a pulse OL–6 constituting the "reading" order, which is introduced into the flip-flop 19B1, and then a pulse OM–1 constituting the "word" order, which is introduced into the flip-flop 19B2. The output of the AND circuit 19LM is then at a positive voltage, and consequently the conductor M10LM is at a positive voltage. The generator 30G thereafter sends a pulse F22–1 to the transmitting member 47. The index 9H contained in the register 27 is converted by the encoder 29 into a reduced address which, in accordance with the wiring effected between the register 27 and the member 47, has the value 1790. Under the effect of a pulse F22–1, this reduced address is introduced into the register RAM, whereafter it effects, following decoding, the positioning of those of the switches of half selectors 12–1, 12–2, 13–1 and 13–2 whose reference commences with the letter I. The generator 30G then sends to the generator 15 a starting pulse DC–6. Following this pulse, the generator 15 successively sends the pulses F12, LE–1, LE–2 . . . F18, FC and FCZ. By a process identical to the preceding ones, five characters are extracted from the store, introduced into the register 16 and then sent through the member 33 to the members 34 and 35. Owing to the fact that the conductor M10LK is not at a positive voltage, no positive voltage is set up at the output of the AND circuits 2061 to 2065, and consequently the circuits 3511, 3512, 3513 . . . 3554, 3555 and 3556 block all the pulses which reach them. Owing to the fact that the conductor M10LM is at a positive voltage, the circuits 3451, 3452 . . . 3415, 3416 allow the passage of the five characters which reach them in the form of pulses. Consequently, these five characters will be entered in the register 17. As has already been stated, the five characters which have been selected from an index constitute a developed address, and it will be assumed that in the present case the developed address which has just been extracted from the store and which is contained in the register 17 is 18941. A pulse F09–1 sent by the generator 30G enables this developed address to be transferred into the register 23. Thereafter, a pulse F02–1 sent by the same generator returns the register 17 to zero. Finally, this generator sends a pulse F01–D, which enables the developed address 18941 of the register 23 to be transferred to the register 24, and the developed address 12390 of the register 24 to be simultaneously transferred to the register 25. Under the action of a pulse F03–2 coming from the generator 30G, the registers 27 and 28 exchange their contents, so that the register 27 stores the index NG while the register 28 stores the index 9H. The index NG contained in the register 27 is converted by the encoder 29 into a reduced address which, in accordance with the wiring between the register 27 and the member 47, has the value 1565. Two pulses OL–7 and OM–2 sent successively by the generator 30G and constituting the "reading" order and the "word" order are introduced into the flip-flops 19B1 and 19B2 respectively. Under the effect of a pulse F22–2 coming from the generator 30G, the reduced address 1565 is introduced into the register RAM. As a result of a starting pulse DC–7 supplied by the generator 30G, the generator 15 again successively sends the pulses F12, LE–1, LE–2 . . . F18, FC and FCZ, which, by a process already explained, permit of extracting five characters from the store and introducing them into the register 17. These five characters constitute a developed address which is, for example, 19022. The generator 30G then sends a pulse F09–2, which permits this developed address to be introduced into the register 23, and thereafter a pulse F02–2 which returns the register 17 to zero. At this instant, the situation is as follows: The register 23 contains the developed address 19022, the register 24 contains the developed address 18941, the register 25 contains the developed address 12390. If the data which are to be added comprise a number of digits and are each preceded by a special character, or "end-of-data" character, which has been introduced into the store and is intended to mark the separation between two groups of characters such as two groups of digits or numbers, the developed addresses 19022 and 18941 have been so chosen as to be the addresses of these special characters, and it will be necessary to add 1 thereto in order to have the developed address of the characters to which the operation is to be applied. A pulse F11–6 sent by the generator 30G enables the developed address of the register 23 to be advanced, and this address then becomes 19023. A series of pulses OL–8, F20–6 and DC–8 successively sent by the said generator then enable a character constituting, in the example chosen, the first operand to be extracted from the store and introduced into the register 18. In the present case, this operand will be the units digit of the first number. A pulse F23–1 supplied by the generator 30G transfers this operand from the register 18 to the adder-subtractor 22, whereafter the generator 30G sends a pulse F01–B which, having been divided into two by the circuits 3001, 3002 and 30R, performs two successive transfers between the contents of the registers 23, 24, 25, so that finally the register 23 contains the developed address 18941, the register 24 contains the developed address 12390, and the register 25 contains the developed address 19023. A pulse F11–7 sent by the generator 30G enables the address contained in the register 23 to be advanced, and this address then becomes 18942. A series of pulses OL–7, F20–7 and DC–9 successively sent by this generator enable a character constituting the second operand in the chosen example to be extracted from the store and introduced into the register 18. In the present case, this second operand will be the units digit of the second number. A pulse F23–2 then enables this operand to be transferred from the register 18 to the adder-subtractor 22. As soon as the adder-subtractor is in possession of the two operands to be processed, a pulse F19 emitted by the generator 30G is sent into the instruction decoder, which validates a pulse F30A after the decoding of the character. The said pulse, which is sent to the adder-subtractor, triggers an operation for the addition of the two operands. The result is thereafter sent by means of a pulse F24 emitted by the generator from the adder-subtractor to the register 18, while the adder-subtractor registers the carry, if any. After a pulse F01–E has been sent by the generator 30G, a further transfer is effected between the contents of the registers 23, 24 and 25 and the developed address 19023 then takes its place in the register 23. It will be recalled that this address 19023 was that of the first operand. The result of the operation, which is contained in the register 18, is then introduced into the store, in the place which was occupied by the first operand. For this purpose, the generator 30G sends a pulse F20–8, which has the effect of introducing the developed address 19023 into the register RAM, and then a starting pulse DC–10. Since neither of the two "reading" and "word" orders has been sent, the flip-flops 19B1 and 19B2 are at zero and consequently the output of the AND circuit 19EK is at a positive voltage, as also is the conductor M10EK. From the instant when it receives the pulse DC–10, the generator 15 sends a pulse F12 which is blocked by the circuit 1901, but which, on the one hand, is transmitted through the circuit 20EK and on the other hand returns the register 16 to zero. The units digit of the developed address contained in the register RAM being 3, the output of the OR circuit 2038 is at a positive voltage and consequently that of the inverter 2038A is not at a positive voltage. The pulse coming from the circuit 20EK is transmitted through the circuits 20EK1, 20EK2, 20EK3 and 20EK5 and thus positions at 1 the four flip-flops 20B1, 20B2, 20B3 and 20B5. Owing to the fact that the conductor 19L is not at a positive voltage, the outputs of the OR circuits 201, 202, 203 and 205 are brought to a positive potential, so that all the coincidence circuits of the member 46L, except the circuit 46L41 to 46L46, can allow the passage of pulses coming from the member 31. The member 46L will then be able to transmit four of the five characters extracted from the store. The output 2040A of the flip-flop 20B4 being at a positive potential, the coincidence circuits 46E41 to 46E46 can alone transmit the pulses coming from the member 36, while the other circuits of the member 46E will block all the pulses which reach them. The member 46E can then transmit only a single character. The generator 15 produces in the half-selectors 12–1, 12–2, 13–1 and 13–2, by sending pulses LE–1 and LE–2, the closing of the corresponding switches. The store column which contains the character situated at the address 19023 is then selected and the five characters which it contains reach the member 46L as a result of the sending of a pulse F14 supplied by the generator 15. All these characters are transmitted by the member 46L, except that which was situated in the store at the address 19023. This character is thus erased from the store, while the other four are stored in the register 16. A pulse F15 sent by the generator 15 is transmitted through the coincidence circuit 1903 owing to the fact that the output of the OR circuit 19EK is at a positive voltage. The said pulse, which is designated F15EK, arrives at the member 36 and brings about the transfer of the character situated in the register 18 to the member 46E. It will be recalled that this character is the result of the addition which has been effected. The said character is transmitted only by the circuits 46E41 to 46E44 and is then introduced into the register 16 in the place which should have been occupied by the character which has been blocked by the circuits 46L41 to 46L44. The generator 15 then sends a pulse F16, which transmits the five characters from the register 16 to the members 34 and 35. In this operation, the state of the flip-flops of the register 16 is not modified, and it can be said that the five characters are not in fact erased from the register 16, but owing to the fact that the conductors M10LM and M10LK are not brought to a positive potential the members 34 and 35 block all the pulses which reach them. Hence, the action of the pulse F16 has been suppressed and the five characters remain in the register 16. The generator 15 thereafter sends the pulses EC–1 and EC–2, which position the corresponding switches in the half-selectors 12–1, 12–2, 13–1 and 13–2. A pulse F17 sent by this generator thereafter brings about the transfer of the five characters from the register 16 to the store. The generator 15 then sends a pulse F18, which returns to zero the register RAM and then the pulses FC and FCZ, which return to zero the flip-flops 19B1, 19B2, 20B1 and 20B5. The process of addition can be repeated, in which case it takes place on the two digits of immediately higher order, i.e., the tens digits of the two numbers. The extraction and the processing of these digits, as also the re-storage of the result will take place in the manner already indicated, by reiteration of the pulses, which may be triggered, for example, by an appropriate looping of the elements of the generator 30G. The operations can be stopped, for example, by the detection of a special "end-of-data" character registered in the store following each of the data, or by any other similar means. The generator 30G then sends a pulse F26 which effects the return to zero of the elements for registering the character T.O. in the instruction decoder, whereby the said elements are enabled subsequently to store the character T.O. of the succeeding instruction after extraction from the store.

In FIGURE 3z, the generator 30G has been shown with additional centre taps which serve, when appropriate conductors are connected thereto, to produce pulses necessary for the performance of various operations such as transfers of data between two peripheral units, introduction of data or instructions into the store, transfers of results to a printer, or any similar operation. For example, a pulse such as F10 may be used to control a transfer of quantity from the register 23 to the register 17.

For the purpose of monitoring, various members such as key generators and key monitors, are attached to the registers previously described, but for the sake of simplicity these members have not been shown in the figures. Likewise, various members or analysers are attached, in principle, to registers such as the register 18 for the purpose of permitting the detection of special characters, such as "end-of-data" characters which are contained in these registers. These members have not been shown because they do not form part of the invention.

Although the description and the accompanying drawings relate to one embodiment of the invention, it is obvious that various adaptations, modifications, additions or omissions may be made within the scope of the said invention without in any way changing the principle of the latter.

I claim:

1. Wired symbolic addressing system for selecting quantities to be processed which are contained in a store, by means of symbolic addresses, called indexes, forming part of instructions recorded in the said store, the said indexes occupying in the said store a reduced number of locations, the said store being adapted to contain three different categories of data, the data of the first category consisting of instructions, the data of the second category consisting of developed addresses, and the data of the third category consisting of the quantities to be processed, the said system comprising first selecting means co-operating with the aforesaid store to select instructions from the said store, an intermediate register designed as a store output in order to receive at least a part of an instruction extracted from the said store, second selecting means co-operating with the said intermediate register to select an index from the aforesaid part of an instruction contained in the said intermediate register, an index register associated with the aforesaid second selecting means in order to receive the said selected index, first transmission means connected to the said index register and to the said first selecting means for transmitting the index contained in the said register to the aforesaid first selecting means in order to select a developed address from the aforesaid store, an address register, second transmission means connected to the aforesaid intermediate register and to the aforesaid address register in order to transmit the aforesaid developed address to the said address register, third transmission means connected to the said address register and to the aforesaid first selecting means in order to transmit this developed address to the aforesaid first selecting means so as to choose from the aforesaid store a quantity to be processed.

2. Wired symbolic addressing system for selecting quantities to be processed which are contained in a store, by means of symbolic addresses, called indexes, forming part of instructions recorded in the said store, the said indexes occupying in the said store a reduced number of locations, the said store being adapted to contain three different categories of data, the data of the first category consisting of instructions, the data of the second category consisting of developed addresses, and the data of the third category consisting of the quantities to be processed, the said system comprising a plurality of members consisting of first selecting means co-operating with the aforesaid store in order to select instructions from the said store, an intermediate register designed as a store output in order to receive at least a part of an instruction extracted from the aforesaid store, second selecting means co-operating with the said intermediate register in order to select an index from the aforesaid part of an instruction contained in the said intermediate register, a first index register associated with the aforesaid second selecting means in order to receive the said selected index, first transmission means connected to the said first index register and to the said first selecting means in order to transmit the index contained in the said first index register to the said first selecting means in order to select a developed address from the aforesaid store, an address register, second transmission means connected to the aforesaid intermediate register and to the said address register in order to transmit the aforesaid developed address to the said address register, third transmission means connected to the said address register and to the aforesaid first selecting means in order to choose, from the aforesaid store, a quantity to be processed, a second index register, fourth transmission means connected to the said first index register and to the said second index register in order to enable these two index registers to exchange their contents, whereby, for the performance of operations, after extraction of an instruction from the store, two indexes successively extracted from the store and forming part of the same instruction can be simultaneously contained in the two aforesaid index registers, whereby the possibility of performing simultaneous transfers of data between the aforesaid members of the system is increased.

3. Wired symbolic addressing system for selecting quantities to be processed which are contained in a store by means of symbolic addresses, called indexes, forming part of instructions recorded in the said store, the said indexes occupying in the said store a reduced number of locations, the said store being adapted to contain three different categories of data, the data of the first category consisting of instructions, the data of the second category consisting of developed addresses and the data of the third category consisting of the quantities to be processed, the said system comprising a plurality of members consisting of first selecting members co-operating with the aforesaid store in order to select instructions from the said store, an intermediate register designed as a store output in order to receive at least a part of an instruction extracted from the aforesaid store, second selecting means co-operating with the said intermediate register in order to select an index from the aforesaid part of an instruction contained in the said intermediate register, a first index register associated with the said second selecting means for receiving the said selected index, first transmission means connected to the said first index register and to the said first selecting means for transmitting the index contained in the said first index register to the said first selecting means in order to select a developed address from the aforesaid store, an address register, second transmission means connected to the aforesaid intermediate register and to the said address register in order to transmit the aforesaid developed address to the said address register, third transmission means connected to the said address register and to the aforesaid first selecting means in order to choose from the aforesaid store a quantity to be processed, a second index register associated with the aforesaid second selecting means for receiving another index contained in the intermediate register and selected by the aforesaid second selecting means, the said second index register being associated with the aforesaid first transmission means in order to enable the said other index to be transmitted to the aforesaid first selecting means, whereby this other index enables another developed address to be selected from the aforesaid store.

4. Wired symbolic addressing system for selecting quantities to be processed which are contained in a store, by means of symbolic addresses, called indexes, forming part of instructions recorded in the said store, the said indexes occupying in the said store a reduced number of locations, the said store being adapted to contain three different categories of data, the data of the first category consisting of instructions, the data of the second category consisting of developed addresses and the data of the third category consisting of the quantities to be processed, the said system comprising a plurality of members consisting of first selecting members co-operating with the aforesaid store in order to select instructions contained in the said store, an intermediate register designed as a store output in order to receive at least a part of an instruction exracted from the aforesaid store, second selecting means co-operating with the said intermediate register in order to select an index from the aforesaid part of an instruction contained in the said intermediate register, an index register associated with the said second selecting means for receiving the said selected index, first transmission means connected to the aforesaid index register and to the said first selecting means in order to transmit the index contained in the aforesaid index register to the said first selecting means for the purpose of selecting a developed address from the aforesaid store, at least one other index register connected to the said second selecting means and to the said first transmission means and intended to contain, where necessary, another index extracted from the aforesaid store, a first address register, second transmission means connected to the aforesaid intermediate register and to the said first address register in order to transmit to the said first address register a developed address extracted from the aforesaid store, at least one other address register, fifth transmission means connected to the aforesaid address registers in order to enable these address registers to exchange their contents, third transmission means connected to the said first address register and to the aforesaid first selecting means for transmitting a developed address contained in the said first address register to the aforesaid first selecting means for the purpose of extracting from the aforesaid store a quanity to be processed.

5. Wired symbolic addressing system for selecting quantities to be processed which are contained in a store by means of symbolic addresses, called indexes, forming part of instructions recorded in the said store, the said indexes occupying in the said store a reduced number of locations, the said store being adapted to contain three different categories of data, the data of the first category consisting of instructions, the data of the second category consisting of developed addresses, and the data of the third category consisting of the quanities to be processed, the said system comprising a plurality of members consisting of first selecting means co-operating with the aforesaid store in order to select instructions contained in the said store, an intermediate register designed as a store output in order to receive at least a part of an instruction extracted from the aforesaid store, second selecting means co-operating with the said intermediate register in order to select an index from the aforesaid part of an instruction contained in the said intermediate register, a first index register associated with the said second selecting means in order to receive the said selected index, first transmission means connected to the said first index register and to the said first selecting means for transmitting the index contained in the said first index register to the said first selecting means in order to select a developed address from the aforesaid store, a first address register, second transmission means connected to the aforesaid intermediate register and to the said first address register for transmitting the aforesaid developed address to the said first address register, a second index register, fourth transmission means connected to the said first index register and to the said second index register in order to enable these two index registers to exchange their contents, at least one other address register, fifth transmission means connected to the aforesaid address registers in order to enable these address registers to exchange their contents, third transmission means connected to the said first address register and to the aforesaid first selecting means for transmitting a developed address contained in the said first address register to the aforesaid first selecting means in order to choose from the aforesaid store a quantity to be processed.

No references cited.

ROBERT C. BAILEY, *Primary Examiner.*

R. B. ZACHE, *Assistant Examiner.*